(12) United States Patent
Nagata et al.

(10) Patent No.: US 7,509,467 B2
(45) Date of Patent: *Mar. 24, 2009

(54) STORAGE CONTROLLER AND DATA MANAGEMENT METHOD

(75) Inventors: Koji Nagata, Kaisei (JP); Shoji Kodama, Sagamihara (JP); Ikuya Yagisawa, Machida (JP); Katsuo Mogi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/822,253

(22) Filed: Jul. 3, 2007

(65) Prior Publication Data

US 2007/0260833 A1 Nov. 8, 2007

Related U.S. Application Data

(63) Continuation-in-part of application No. 11/358,051, filed on Feb. 22, 2006, and a continuation-in-part of application No. 11/449,668, filed on Jun. 9, 2006.

(30) Foreign Application Priority Data

| Jan. 13, 2006 | (JP) | ............................. 2006-005580 |
| Feb. 9, 2006 | (JP) | ............................. 2006-032927 |

(51) Int. Cl.
    *G06F 12/00* (2006.01)
(52) U.S. Cl. ...................................... 711/162
(58) Field of Classification Search ................. 711/162
    See application file for complete search history.

(56) References Cited

U.S. PATENT DOCUMENTS

| 5,790,773 A | 8/1998 | DeKoning et al. |
| 5,835,953 A | 11/1998 | Ohran |
| 6,038,639 A | 3/2000 | O'Brien et al. |
| 6,131,148 A | 10/2000 | West et al. |
| 6,253,295 B1 | 6/2001 | Beal et al. |

(Continued)

FOREIGN PATENT DOCUMENTS

EP  1 424 632 A2  2/2003

(Continued)

OTHER PUBLICATIONS

European Search Report mailed May 21, 2007.

*Primary Examiner*—Brian R Peugh
(74) *Attorney, Agent, or Firm*—Reed Smith LLP; Stanley P. Fisher, Esq.; Juan Carlos A. Marquez, Esq.

(57) ABSTRACT

Upon receiving a primary/secondary switching command from a secondary host system, a secondary storage control device interrogates a primary storage control device as to whether or not yet to be transferred data that has not been remote copied from the primary storage control device to the secondary storage control device is present. In the event that yet to be transferred data is present, the secondary storage control device receives yet to be transferred data from the primary storage control device and updates a secondary volume. The primary storage control device then manages positions of updates to the primary volume due to host accesses to the primary volume occurring at the time of the secondary storage control device receiving the primary/secondary switching command onwards using a differential bitmap table.

18 Claims, 27 Drawing Sheets

U.S. PATENT DOCUMENTS

| | | |
|---|---|---|
| 6,397,308 B1 | 5/2002 | Ofek et al. |
| 6,434,186 B2 | 8/2002 | Dowling |
| 6,434,681 B1 | 8/2002 | Armangau |
| 6,643,671 B2 | 11/2003 | Milillo et al. |
| 6,694,413 B1 | 2/2004 | Mimatsu et al. |
| 6,748,504 B2 | 6/2004 | Sawdon et al. |
| 6,771,843 B1 | 8/2004 | Huber et al. |
| 6,981,114 B1 | 12/2005 | Wu et al. |
| 7,363,446 B2 * | 4/2008 | Higaki et al. ............... 711/162 |
| 2003/0065901 A1 | 4/2003 | Krishnamurthy |
| 2003/0101321 A1 | 5/2003 | Ohran |
| 2003/0131193 A1 | 7/2003 | Kodama et al. |
| 2003/0131278 A1 | 7/2003 | Fujibayashi |
| 2003/0221077 A1 | 11/2003 | Ohno et al. |
| 2003/0229656 A1 | 12/2003 | Hitz et al. |
| 2004/0177226 A1 | 9/2004 | Chen |
| 2004/0199733 A1 | 10/2004 | Watanabe et al. |
| 2005/0210193 A1 | 9/2005 | Nagata |
| 2005/0210209 A1 * | 9/2005 | Nagata ....................... 711/162 |
| 2005/0210210 A1 | 9/2005 | Arai et al. |
| 2005/0216682 A1 | 9/2005 | Shinozaki et al. |
| 2005/0289309 A1 * | 12/2005 | Suzuki ....................... 711/162 |
| 2006/0069889 A1 * | 3/2006 | Nagaya et al. .............. 711/162 |

FOREIGN PATENT DOCUMENTS

| | | |
|---|---|---|
| JP | 11-259348 | 1/1999 |
| JP | 2005-267569 | 3/2004 |
| JP | 2005-275494 | 3/2004 |
| JP | 2005-293469 | 4/2005 |

* cited by examiner

- 200 INTERNAL COPY EXECUTION PROGRAM
- 210 REMOTE COPY EXECUTION PROGRAM
- 220 CONTROL PROGRAM
- 230 VOLUME MANAGEMENT TABLE
- 240 HASH MANAGEMENT TABLE
- 250 COMMAND EXECUTION PROGRAM
- 260 COMPILED COMMUNICATION EXECUTION PROGRAM

| VOL-ID | PATH INFORMATION | VOL TYPE | POOL VOL FLAG | PAIR INFORMATION (EX:PAIR PARTNER INFORMATION, PAIR STATUS) |
|---|---|---|---|---|
| 1 | ... | PRIMARY VOL | 0 | .... |
| 2 | - | - | 1 | .... |
| 3 | - | - | 1 | .... |
| 4 | - | - | 1 | .... |
| ⋮ | ⋮ | ⋮ | ⋮ | ⋮ |

FIG.5

| TIME | ACTION | PRIMARY VOL | VIRTUAL VOL | SNAPSHOT MANAGEMENT INFORMATION | SECONDARY VOL | VIRTUAL VOL |
|---|---|---|---|---|---|---|
| TIME t0 | SPLIT TIME OF PRIMARY VOLUME AND VIRTUAL VOLUME | IMAGE T0 [A] | IMAGE T0 (SIZE=0) | INFORMATION FOR RESTORING IMAGE T0 | — | — |
| TIME t1 | EXECUTE REMOTE COPY | IMAGE T1 [B] | IMAGE T0 [A] | INFORMATION FOR RESTORING IMAGE T0 | — | — |
| TIME t2 | COMPLETE REMOTE COPY | IMAGE T2 [C] | IMAGE T0 [A] | INFORMATION FOR RESTORING IMAGE T0 | IMAGE T0 [A] | — |
| TIME t3 | SPLIT TIME OF PRIMARY VOLUME AND VIRTUAL VOLUME | IMAGE T3 [D] | IMAGE T3 (SIZE=0) | INFORMATION FOR RESTORING IMAGE T3 | IMAGE T0 [A] | — |
| TIME t4 | EXECUTE REMOTE COPY | IMAGE T4 [E] | IMAGE T3 [D] | INFORMATION FOR RESTORING IMAGE T3 | IMAGE T0 [A] | — |
| TIME t5 | COMPLETE REMOTE COPY | IMAGE T5 [F] | IMAGE T3 [B][D] | INFORMATION FOR RESTORING IMAGE T3 | IMAGE T3 [B][D] | IMAGE T3 [A] |
| TIME t6 | SPLIT TIME OF PRIMARY VOLUME AND VIRTUAL VOLUME | IMAGE T6 [G] | IMAGE T6 (SIZE=0) | INFORMATION FOR RESTORING IMAGE T6 | IMAGE T3 [B][D] | IMAGE T3 [A] |
| ... | ... | ... | ... | ... | ... | ... |

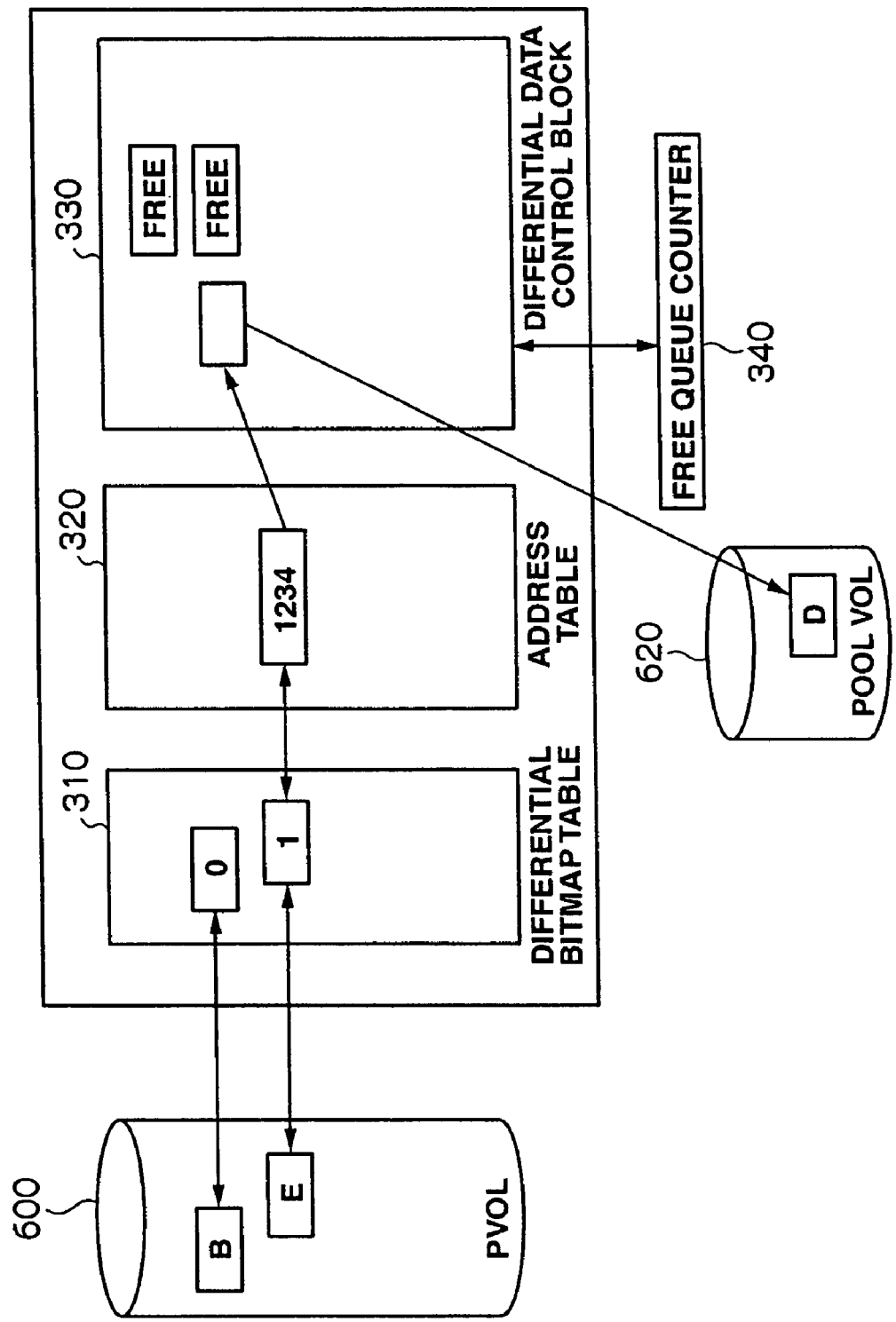

POOL GROUP — PVOL
CORRESPONDENCE TABLE                    900

| POOL GROUP # | ASSIGNED LU | PVOL# |
|---|---|---|
| 1 | 1,2,3 | 1 |
| 2 | 4,5,6 | 2,3 |
| ⋮ | ⋮ | ⋮ |

TRANSITION TO EMPTY QUEUE

TRANSITION TO EMPTY QUEUE

STORAGE CONTROLLER AND DATA MANAGEMENT METHOD

CROSS-REFERENCES TO RELATED APPLICATIONS

This application is a Continuation-in-Part application of U.S. application Ser. No. 11/358,051 filed on Feb. 22, 2006 and U.S. application Ser. No. 11/449,668 filed on Jun. 9, 2006. Priority is claimed based on U.S. application Ser. No. 11/358,051 filed on Feb. 22, 2006 and U.S. application Ser. No. 11/449,668 filed on Jun. 9, 2006, which claim the priority of Jan. 13, 2006 and Feb. 9, 2006, the filing dates of Japanese Patent Application Nos. 2006-005580 and 2006-032927, respectively, the entire disclosures of which are incorporated herein by reference.

BACKGROUND

The present invention relates to a storage controller and its data management method, and, for instance, can be suitably applied to a storage system that replicates a volume of a storage controller storing data transmitted from a host system in another storage controller.

Conventionally, known is technology for managing the backup of a volume of a storage controller (hereinafter referred to as a "primary storage controller") storing data transmitted from a host system operated in a certain site for disaster recovery of the storage system in a volume of a storage controller (hereinafter referred to as a "secondary storage controller") established at a remote site (this technology is hereinafter referred to as "remote copying"), and various other related technologies have been proposed.

For example, in Japanese Patent Laid-Open Publication No. H11(1999)-259348, the primary storage controller has at least one volume and transmits a request for acquiring at least a part of the snapshot of such volume to a secondary storage controller, and the secondary storage controller replies to the request for acquiring the snapshot and has a volume which is a replicated copy of the volume of the primary storage controller, and the volume of the primary storage controller is replicated in the volume of the secondary storage controller by acquiring the snapshot of the corresponding portion.

Further, for instance, in Japanese Patent Laid-Open Publication No. 2005-267569, the storage controller controls the reading and writing of data from and in a first volume, controls the data newly stored in the volume to be written in a second volume as differential data per generation, and manages differential data by providing, in an area of a memory, a snapshot management table managing the relationship of differential data per generation stored in the second volume. And, the storage controller generates a virtual volume of a specific generation with the snapshot management table, and thereby performs remote copying with this virtual volume.

Moreover, for example, in Japanese Patent Laid-Open Publication No. 2005-275494, the secondary storage controller receives difference-related information from the primary storage controller, generates generation management information based on the received difference-related information, and restores the stored contents of the designated generation based on the generated generation management information and the volume of the secondary storage controller.

In a database system handling vast scales of data such as a data center, data is managed using a storage system configured separately from a host system. For example, a disc array system is well-known as this kind of storage system. In a disc array system, a large number of disc drives arranged in an array are managed as a RAID (Redundant Array of Independent Inexpensive Disks). At least one physical unit is then formed on the physical storage region provided by the large number of disc drives and this logical unit is provided to the host system. The host system then recognizes the logical unit as a single physical device and accesses data on the logical unit.

This type of storage system is taken as a measure for reliably preserving data should accidents etc. occur. For example, a system with a high fault tolerance is disclosed in Japanese Patent Laid-open Publication No. 2005-293469 where data written to a primary storage control device is remote copied to a secondary storage control device so that the data is duplicated.

SUMMARY

Meanwhile, with the conventional storage system, in order to avoid the management bit of data of the volume acquired with the snapshot in the primary storage controller from becoming insufficient, this management bit is managed in a data size of a sufficiently large differential management unit in comparison to the data transferred from the host system to the primary storage controller.

Nevertheless, with this kind of storage system, since the data size of the data transferred from the host system to the primary storage controller is smaller in comparison to the data size of the differential management unit, when transferring the data, which was transferred from the host system, from the primary storage controller to the secondary storage controller, even though the data size of the data transferred from the host system to the primary storage controller is small, such data must be transferred in the data size of the differential management unit.

Thus, with this kind of storage system, in comparison to the data transfer from the host system to the primary storage controller, the data transfer from the primary storage controller to the secondary storage controller becomes slower, and differential data awaiting transfer from the primary storage controller to the secondary storage controller may become accumulated in the primary storage controller.

Meanwhile, with this kind of storage system, when the data size of the differential management unit is made to be small, the management bit count for managing the differential data must be increased, and an enormous memory capacity will become required for retaining such management bit.

The present invention was devised in view of the foregoing points, and an object thereof is to provide a storage controller and data management method capable of effectively preventing the increase in memory capacity and dramatically improving the transfer efficiency of data.

In order to achieve the foregoing object, the present invention provides a storage controller providing a volume for storing data transmitted from a host system, including: a management unit for managing the data written in the volume with a first block area, or a second block area in the first block area which is smaller than the first block area; a snapshot acquisition unit for acquiring a snapshot of the volume at a prescribed timing; and a transfer unit for transferring the data of the volume acquired with the snapshot of the snapshot acquisition unit to an external device with the first block area or the second block area.

Therefore, when the data to be transferred to the external device in the first block area is small, data traffic can be reduced by transferring data with the second block area, and, when the data to be transferred to the external device in the first block area is large, the number of second block areas to be managed can be reduced by transferring data with the first block area.

Further, the present invention also provides a data management method of a storage controller providing a volume for storing data transmitted from a host system, including: a first step for managing the data written in the volume with a first block area, or a second block area in the first block area which is smaller than the first block area; a second step for acquiring a snapshot of the volume at a prescribed timing; and a third step for transferring the data of the volume acquired with the snapshot of the snapshot acquisition unit to an external device with the first block area or the second block area.

Therefore, when the data to be transferred to the external device in the first block area is small, data traffic can be reduced by transferring data with the second block area, and, when the data to be transferred to the external device in the first block area is large, the number of second block areas to be managed can be reduced by transferring data with the first block area.

According to the present invention, since a storage controller providing a volume for storing data transmitted from a host system includes a management unit for managing the data written in the volume with a first block area, or a second block area in the first block area which is smaller than the first block area; a snapshot acquisition unit for acquiring a snapshot of the volume at a prescribed timing; and a transfer unit for transferring the data of the volume acquired with the snapshot of the snapshot acquisition unit to an external device with the first block area or the second block area, when the data to be transferred to the external device in the first block area is small, data traffic can be reduced by transferring data with the second block area, and, when the data to be transferred to the external device in the first block area is large, the number of second block areas to be managed can be reduced by transferring data with the first block area. As a result, provided is a storage controller and data management method capable of effectively preventing the increase in memory capacity and dramatically improving the transfer efficiency of data.

In addition, if a fault occurs in a host system making data input/output requests to the primary storage control device or if faults occur at both the primary storage control device and the host system, it is necessary to switch over the primary and secondary storage control devices to continue operation. In the event of transferring data from a primary storage control device to a secondary storage control device using an asynchronous remote copy, at the time of switching between the primary and the secondary devices, it is assumed that there may be cases where un-transferred data that has not yet been transferred from the primary storage control device to the secondary storage control device may exist. It is therefore necessary to subject un-transferred data to appropriate processing in order to make the data at the secondary storage control device as recent as possible. Further, when a fault occurs in the host system, it is assumed that there may also be cases where a write access is requested to the primary storage control device in the middle of a primary/secondary switching process and it is therefore necessary to process this kind of write access in an appropriate manner.

The present invention therefore tackles the problem of carrying out a process of switching between primary and secondary storage control devices at the time of a system fault. The further objects of the present invention will become apparent from an embodiment disclosed in the following.

In order to resolve the problem described above, the storage system of the present invention comprises a primary storage control device having a first logical volume and a secondary storage control device having a second logical volume capable of forming a copy pair with the first logical volume.

The primary storage control device is comprised of a first differential bitmap table for managing positions of updates to the first logical volume due to host accesses, first snapshot management information for logically reconfiguring a data image of the first logical volume, a first pool region for storing data prior to updating constituted by data prior to updating as a result of a host access that is data written to the first logical volume, a first writing section for writing the data prior to updating to the first pool region when the first logical volume is updated at a predetermined timing onwards, a first snapshot updating section for updating the first snapshot management information with information for logically reconfiguring a data image for the first logical volume occurring at the time of the predetermined time when the first logical volume is updated at the predetermined timing onwards, a first transfer differential bitmap table for managing whether or not update data of the first logical volume has been remote copied to the second logical volume, a transfer bitmap table update section for updating the first transfer differential bitmap table by merging bit information of the first differential bitmap table with the first transfer differential bitmap table and a remote copy section for discerning whether each data constituting a data image for the first logical volume at the point in time of the predetermined timing is in the first logical volume or the first pool region based on the updated first transfer differential bitmap table, and acquiring data from the discerned party and transmitting the data to the second logical volume.

The secondary storage control device is comprised of a second transfer differential bitmap table for managing positions of updates to the second logical volume due to remote copying, second snapshot management information for logically reconfiguring a data image of the second logical volume, a second pool region for storing data prior to updating constituted by data prior to updating as a result of remote copying that is data written to the second logical volume, a second writing section for writing the data prior to updating to the first pool region when the second logical volume is updated as a result of remote copying, and a second snapshot updating section for updating the second snapshot management information with information for logically reconfiguring a data image for the second logical volume occurring at the time of the predetermined time when the second logical volume is updated.

Upon receiving a primary/secondary switching command from a host system, the secondary storage control device interrogates a primary storage control device as to whether or not yet to be transferred data that has not been remote copied from the primary storage control device to the secondary storage control device is present. In the event that not yet transferred data is present, the not yet transferred data is received from the primary storage control device and the second logical volume is updated.

The primary storage control device then manages positions of updates to the first logical volume due to host accesses to the first logical volume occurring at the time of the secondary storage control device receiving the primary/secondary switching command onwards using the first differential bitmap table.

In the event that there is no response from the primary storage control device to the interrogation for yet to be transferred data, the secondary storage control device restores a data image for the second logical volume at a certain time in the past based on the second snapshot management information.

According to the present invention, it is possible to carry out a primary/secondary switching process for a storage control device at the time of system failure in an appropriate manner.

DESCRIPTION OF DRAWINGS

FIG. 5 is a conceptual diagram for explaining the asynchronous remote copying processing sequence;

FIG. 6 is a conceptual diagram for explaining the outline of the snapshot update processing;

DETAILED DESCRIPTION

An embodiment of the present invention is now explained with reference to the drawings.

(1) Configuration of Storage System in Present Embodiment

Figure 1:
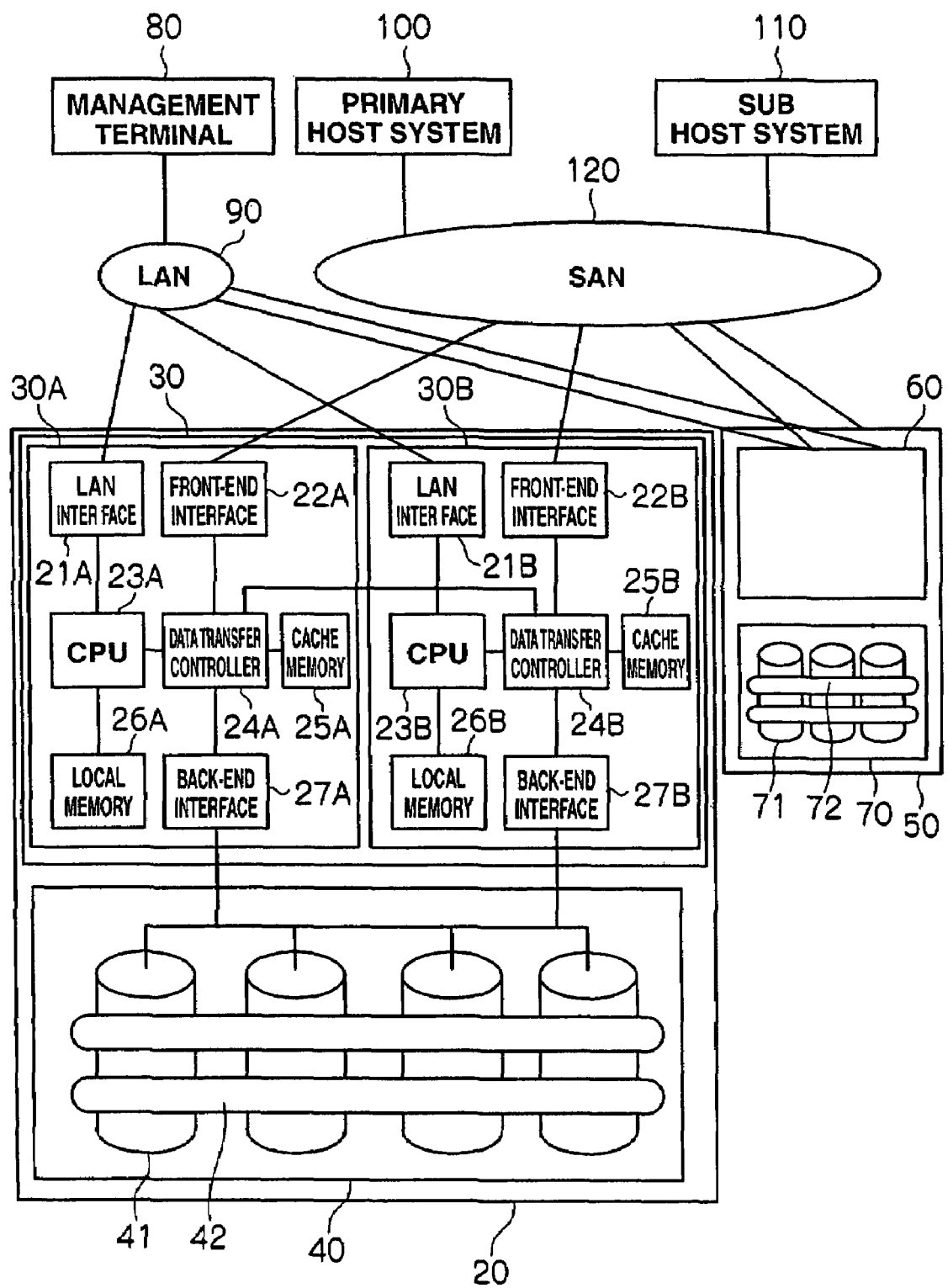
FIG. 1 is a schematic diagram showing a configuration of the storage system according to the present embodiment.

FIG. 1 is the system configuration of a storage system 10 according to the present embodiment. The storage system 10 comprises a primary storage controller 20 and a secondary storage controller 50. The primary storage controller 20, secondary storage controller 50, a primary host system 100 and a secondary host system 110 are interconnected via a SAN (Storage Area Network) 120.

The primary host system 100 is a regular-use host system, and primarily requests the primary storage controller 20 to perform I/O processing when the system is normal. The secondary host system 110 is a standby host system, and primarily requests the secondary storage controller 50 to perform I/O processing when a failure occurs in the system, and takes over the processing performed by the primary host system 100 when a failure occurs. The primary host system 100 and secondary host system 110, for instance, are a personal computer, workstation, mainframe computer or the like.

The storage system 10 is configured such that data written in the primary storage controller 20 is remote copied in the secondary storage controller 50. The secondary storage controller 50 retains the data image that is the same as the data image previously retained by the primary storage controller 20.

Thereby, even when a failure occurs in the primary storage controller 20, the system can be operated by using the secondary storage controller 50.

As the remote copying, on the condition that data is written in both the primary storage controller 20 and secondary storage controller 50, this may be a synchronous copy of reporting the write completion to the primary host system 100, or an asynchronous copy of reporting the write completion to the primary host system 100 at the stage when data is written in the primary storage controller 20, and transferring such data to the secondary storage controller 50 at a suitable timing.

In the following explanation, examples are shown where the primary storage controller 20 is operated as the operative primary storage controller, and the secondary storage controller 50 is operated as the standby secondary storage controller.

The primary storage controller 20 primarily has a controller 30 and a storage apparatus system 40. The controller 30 is configured from two controllers; namely, controllers 30A and 30B for the improvement of reliability.

The controller 30A has a LAN (Local Area Network) interface 21A, a front-end interface 22A, a CPU 23A, a data transfer controller 24A, a cache memory 25A, a local memory 26A and a back-end interface 27A. The detailed configuration of the controller 30B is the same as the detailed configuration of the controller 30A described above. Incidentally, when an indication is made without adding the subscripts of "A" and "B", it means that either controller 30A or 30B may be used, and shows that one of the controllers is being used.

The controller 30 is capable of controlling a plurality of disk drives 41 at a RAID level (for instance, level 0, 1 or 5) prescribed in a so-called RAID system. In the RAID system, a plurality of disk drives 41 are managed as a single RAID group. A plurality of logical volumes 42, which are access units from the primary host system 100, are defined in the RAID group. The respective logical volumes 42 are assigned a LUN (Logical Unit Number).

The CPU 23 is a processor for controlling the processing of an I/O command (write command or read command) to the plurality of disk drives 41 in response to the data I/O request from the primary host system 100.

The local memory 26 stores various micro programs, a volume management table, a hash management table and so on. Details regarding the various micro programs, volume management table and hash management table will be described later. The local memory 26 is configured as a volatile memory capable of high-speed access for reading/writing.

The cache memory 25 is a buffer memory for temporarily storing write data to be written in the disk drive 41 and read data to be read from the disk drive 41. The cache memory 25 has a backup power source, and is configured as an involatile memory for preventing the loss of cache data even when a power source failure occurs in the primary storage controller 20.

The data transfer controller 24 interconnects the cache memory 25, front-end interface 22, back-end interface 27 and CPU 23, and controls the data transfer between the primary host system 100 and disk drive 41.

Further, the data transfer controller 24 is communicably connected to another data transfer controller 24, and is able to transfer write commands, read commands, write data and read data to and from the other data transfer controller 24.

When a write command transmission request is made from the primary host system 100, the data transfer controller 24 writes the data received from the primary host system 100 via the front-end interface 22 in the cache memory 25, and, for the purpose of asynchronously writing such write data in the disk drive 41, it thereafter transfers such write data to the back-end interface 27.

Further, the data transfer controller 24 transfers the data received from the primary host system 100 via the front-end interface 22 to the other data transfer controller 24. And, the other data transfer controller 24 writes the received data in the cache memory 25 of the controller.

Like this, by dual writing the write data received from the primary host system 100 in the cache memory 25 upon receiving a write command from the primary host system 100, even when a failure occurs in one of the controllers among the controllers 30, the other controller is able to continue performing processing.

Further, upon receiving a read command from the primary host system 100, the read data read from the disk drive 41 via the back-end interface 27 is written in the cache memory 25, and such read data is transferred to the front-end interface 22.

The front-end interface 22 is a controller for controlling the interface with the primary host system 100, and, for instance, has a function of receiving a block access request from the primary host system 100 based on a fibre channel protocol.

The back-end interface 27 is a controller for controlling the interface with the disk drive 41, and, for instance, has a function of controlling the data I/O request to the disk drive 41 based on a protocol for controlling the disk drive 41.

The LAN interface 21 is an interface to be connected to the LAN 90, and controls the transmission/reception of data and control signals with the management terminal 80 based on TCP/IP.

The storage apparatus system 40 has a plurality of disk drives 41. The disk drive 41 is a storage device such as a FC (Fibre Channel) disk drive, SATA (Serial Advanced Technology Attachment) disk drive, PATA (Parallel Advanced Technology Attachment) disk drive, FATA (Fibre Attached Technology Adapted) disk drive, SAS (Serial Attached SCSI) disk drive or SCSI (Small Computer System Interface) disk drive.

The primary storage controller 20 is connected to the management terminal 80 via the LAN (Local Area Network) 90. The management terminal 80, for instance, is a computer system including hardware resources such as a CPU, memory, display and so on. The system administrator transmits a command for managing the primary storage controller 20 to the primary storage controller 20 by performing input operations with the management terminal 80.

As a command for managing the primary storage controller 20, for example, this may be a command for increasing or decreasing the storage device 41 or changing the RAID configuration, a command for setting a communication path between the primary host system 100 and primary storage controller 20, a command for installing the micro program of the CPU 23 in the memory 26, a command for confirming the operation status of the primary storage controller 20 or specifying the failed portion, and so on.

The secondary storage controller 50 primarily has a controller 60 and a storage apparatus system 70. The detailed configuration of the controller 60 is the same as the detailed configuration of the controller 30 described above. The controller 60 is configured from two controllers; namely, controllers 60A and 60B for the improvement of reliability.

The controller 60A has a LAN interface 61A, a front-end interface 62A, a CPU 63A, a data transfer controller 64A, a cache memory 65A, a local memory 66A, and a back-end interface 67A. The detailed configuration of the controller 30B is the same as the detailed configuration of the controller 60A described above. Incidentally, when an indication is made without adding the subscripts of "A" and "B", it means that either controller 60A or 60B may be used, and shows that one of the controllers is being used. The detailed configuration of the controller 60A-B is the same as the detailed configuration of the controller 30 described above. The storage apparatus system 70 has a plurality of disk drives 71.

The controller 60 is capable of controlling a plurality of disk drives 71 at a RAID level (for instance, level 0, 1 or 5) prescribed in a so-called RAID system. In the RAID system, a plurality of disk drives 71 are managed as a single RAID group. A plurality of logical volumes 72, which are access units from the secondary host system 110, are defined in the RAID group. The respective logical volumes 72 are assigned a LUN (Logical Unit Number).

Figures 2, 3:
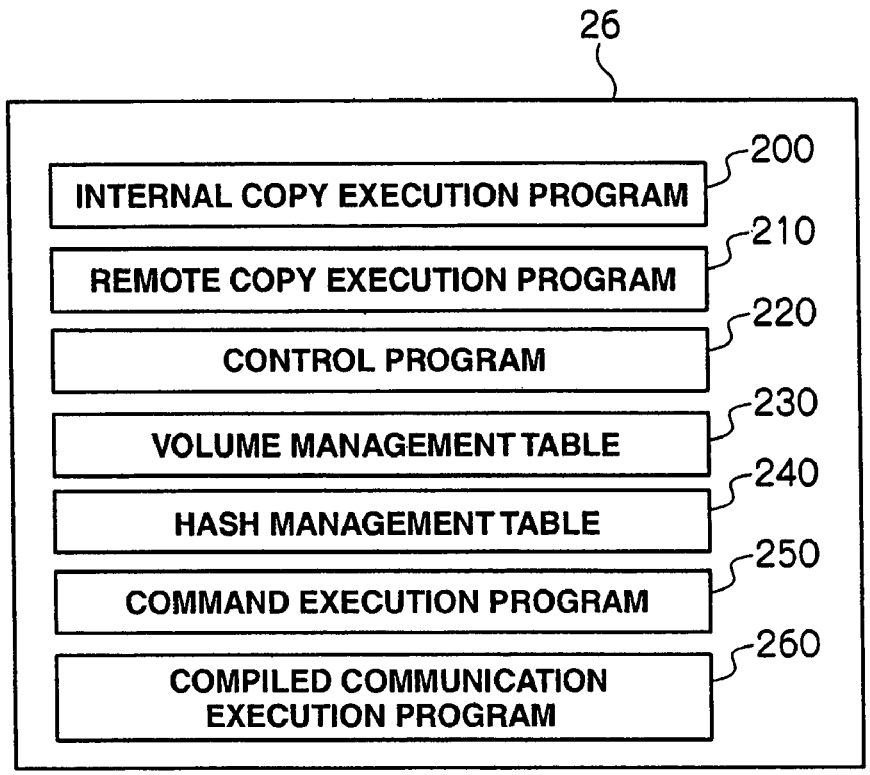
FIG. 2 is a schematic diagram showing a configuration of the local memory.
FIG. 3 is a conceptual diagram for explaining the volume management table.

FIG. 2 shows various micro programs, a volume management table and a hash management table. The local memory 26 stores an internal copy execution program 200, a remote copying execution program 210, a control program 220, a volume management table 230, a hash management table 240, a command job priority execution program 250, and a collective communication execution program 260. Incidentally, the local memory 66 does not store the hash management table 240 and command job priority execution program 250.

The internal copy execution program 220 executes internal copy processing and snapshot update processing. The remote copying execution program 210 executes remote copying. The control program 220 controls the internal copy execution program 200 and remote copying execution program 210. The volume management table 230 stores information concerning the plurality of logical volumes 42. Incidentally, the hash management table 240, command job priority execution program 250 and collective communication execution program 260 will be described later.

FIG. 3 shows a table configuration of the volume management table 230. The volume management table 230 associates and stores a VOL-ID for identifying a logical volume (hereinafter sometimes abbreviated as "VOL") regarding the respective plurality of logical volumes 42, path information showing the access path to the logical volume, type of such logical volume (hereinafter referred to as the "VOL type"), a flag showing whether the logical volume is a pool VOL (hereinafter referred to as the "pool VOL flag"), and information concerning the VOL pair containing the logical volume (hereinafter referred to as the "pair information"). At least one of the information elements (for instance, VOL-ID, VOL type, pool VOL flag) among the information stored in the volume management table 230 is input form the management terminal 80 or primary host system 100.

As the VOL type, for instance, there is "primary", "secondary" and "pool". The "primary" type VOL (hereinafter referred to as a "primary VOL" or "PVOL") is a VOL that becomes the copy source in copy processing (for example, in remote copy processing). The "secondary" type VOL (hereinafter referred to as a "secondary VOL" or "SVOL") is a VOL that becomes the copy destination in copy processing (for example, in remote copy processing).

The secondary VOL has a storage capacity that is at least greater than the capacity of the primary VOL. The primary VOL and secondary VOL both have defined path information. However, the "pool" type VOL (hereinafter referred to as a "pool VOL") does not have defined path information. Details regarding the pool VOL are described later.

The pool VOL flag shows whether the corresponding logical volume is a pool VOL. Specifically, for example, if the pool VOL flag is "1", the corresponding logical volume is a pool VOL, and, if the pool VOL flag is "0", the corresponding logical volume is not a pool VOL.

Pair information, for instance, contains pair partner information and pair status. Pair partner information includes, for example, as information relating to a logical volume to become a pair partner (hereinafter referred to as a "pair partner VOL"), the ID of the storage controller having a pair partner VOL, VOL-ID of the pair partner VOL, path information and so on. As the pair status, for example, there are "SMPL", "COPY", "PAIR", "PSUS", "SPLIT", "SSWS" and so on.

"SMPL" shows a state where there is no primary/secondary relationship before the generation of a pair.

"COPY" shows a state of forming a copy of data of the primary VOL in the secondary VOL. In "COPY", writing of data in the secondary VOL is prohibited.

"PAIR" shows a state of performing asynchronous copying from the primary VOL to the secondary VOL. In "PAIR", writing of data in the secondary VOL is prohibited.

"PSUS" shows a state where asynchronous copying from the primary VOL to the secondary VOL is suspended. In "PSUS", reading/writing of data from and in the secondary VOL is prohibited.

"SPLIT" shows a state of logically separating the primary VOL and secondary VOL, and copying only the differential data before and after the update of the primary VOL in the secondary VOL.

"SSWS" shows a state where the reading/writing of data is enabled in the secondary VOL. In "SSWS", data of the secondary VOL is restored to the previously determined contents, and the primary VOL changes to "PSUS".

By the CPU 23 referring to the volume management table 230, it is able to specify the type of logical volume 42 to be accessed and the pair information. Further, when the pool VOL is assigned to the virtual VOL described later, the CPU 23 is able to define information representing the path to such pool VOL, and register the defined path information in the volume management table 230.

Further, the CPU 23 is able to change the pool VOL to an unused state by erasing the path information regarding the pool VOL that is no longer assigned. The CPU 23 is able to determine whether each pool VOL is being used or in an unused state depending on whether path information is registered in the respective pool VOLs.

Figure 4:
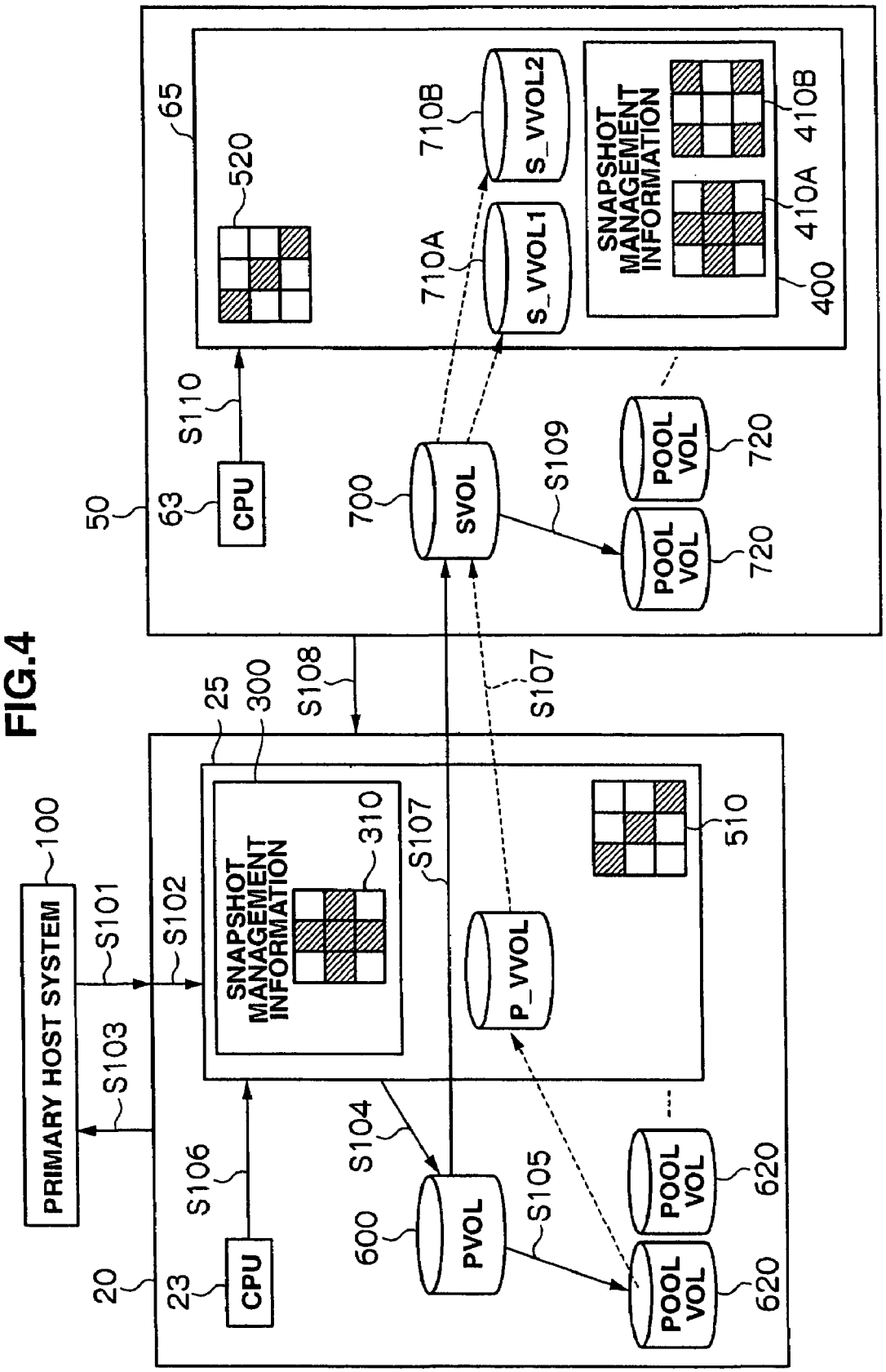
FIG. 4 is a conceptual diagram for explaining the outline of the asynchronous remote copying processing.

FIG. 4 shows the outline of the asynchronous remote copying processing to be executed with the primary storage controller 20. The primary storage controller 20 has a CPU 23, a cache memory 25, a primary VOL 600, a virtual VOL 610, a plurality of pool VOLs 620, snapshot management information 300, and a transfer differential bitmap table 510.

The pool VOL 620 is a logical volume for saving the differential data before and after the update when the data image of the primary VOL 600 is updated after the point in time when the pair status of the primary VOL 600 and virtual VOL 610 is split.

The virtual VOL 610 is a virtual logical volume for restoring the data image of the primary VOL 600 at a certain time from the data stored in the primary VOL 600 at a certain time and the data saved from the primary VOL 600 to the pool VOL 620 at a certain time.

The virtual VOL 610 is capable of logically retaining a snapshot of the primary VOL 600. The virtual VOL 610 is capable of forming a pair with the primary VOL 600 or secondary VOL 700.

In the present embodiment, although a case is explained where the virtual VOL 610 is formed in a storage area of the cache memory 25, it may also be formed in a storage area of the disk drive 41. For the sake of convenience of explanation, the virtual VOL 610 is sometimes abbreviated as P_VVOL.

The CPU 23 is able to select one or more pool VOLs 620 (for instance, unused pool VOLs not associated with any VOL) from among a plurality of pool VOLs 620 to the virtual VOL 610, and assign the selected one or more pool VOLs 620 to the virtual VOL 610. The CPU 23 is able to appropriately increase or decrease the number of pool VOLs 620 to be assigned to the virtual VOL 610 according to the consumption status of the storage resource.

The snapshot management information 300 is information for restoring the data image of the primary VOL 600 at a certain time using a snapshot. The CPU 23, by referring to the snapshot management information 300, is able to determine whether each data configuring the data image of the primary VOL 600 at a certain time exists in the pool VOL 620 or in the primary VOL 600, and, by acquiring data from the determined VOL, is able to restore the data image of the primary VOL 600 at a certain time in the virtual VOL 610. The snapshot management information 300 includes a differential bitmap table 310 showing the data update position of the primary VOL 600.

The transfer differential bitmap table 510 shows the position of the differential data (that is; the data update position of the primary VOL 600) to be remote copied to the secondary VOL 700 when data of the primary VOL 600 is updated after data of the primary VOL 600 is initially copied in the secondary VOL.

The CPU 23 is able to make the pair status between the primary VOL 600 and virtual VOL 610 a copy status. If data is written in the primary VOL 600 when the pair status between the primary VOL 600 and virtual VOL 610 is a copy status, the CPU 23 writes such data in the virtual VOL 610 or pool VOL 620.

The CPU 23 is able to make the pair status between the primary VOL 600 and virtual VOL 610 a split status. If data is written in the primary VOL 600 when the pair status between the primary VOL 600 and virtual VOL 610 is a split status, the CPU 23 operates the internal copy program 200 and executes internal copy processing and snapshot update processing.

The secondary storage controller 50 has a CPU 63, a cache memory 65, a secondary VOL 700, a plurality of virtual VOLs 710A, 710B, a plurality of pool VOLs 720, snapshot management information 400, and a transfer differential bitmap table 520.

The pool VOL 720 is a logical volume for saving the differential data before and after the update when the data image of the secondary VOL 700 is updated after the point in time the pair status of the secondary VOL 700 and virtual VOL 710A or virtual VOL 710B is split.

The virtual VOLs 710A, 710B are virtual logical volumes for restoring the data image of the secondary VOL 700 at a certain time from data stored in the secondary VOL 700 at a certain time and data saved from the secondary VOL 700 to the virtual VOLs 710A, 710B at a certain time. The virtual VOLs 710A, 710B are capable of logically retaining a snapshot of the secondary VOL 700.

In the present embodiment, although a case is explained where the virtual VOLs 710A, 710B are formed in a storage area of the cache memory 65, these may also be formed in a storage area of the disk drive 71. For the sake of convenience of explanation, the virtual VOLs 710A, 710B are sometimes abbreviated as S_VVOL.

The snapshot management information 400 is information for restoring the data image of the secondary VOL 700 at a certain time using a snapshot. The CPU 63, by referring to the snapshot management information 400, is able to determine whether each data configuring the data image of the secondary VOL 700 at a certain time exists in the pool VOL 720 or in the secondary VOL 700, and, by acquiring data from the determined VOL, is able to restore the data image of the secondary VOL 700 at a certain time in the virtual VOLs 710A, 710B. The snapshot management information 400 includes differential bitmap tables 410A, 410B showing the data update position of the secondary VOL 700.

The transfer differential bitmap table 520 shows the position where the data of the primary VOL 600 has been updated based on remote copying when data of the primary VOL 600 is updated after data of the primary VOL 600 is initially copied in the secondary VOL.

Next, the internal copy processing, snapshot update processing, and remote copy processing are explained in detail. The following explanation is based on the premise that the pair status between the primary VOL 600 and virtual VOL 610 is a split status.

When the primary storage controller 20 receives a write command from the primary host system 100 (S101), it stores the write data in the cache memory 25 (S102), and reports the write completion to the primary host system 100 (S103).

The CPU 23 reads the written write data from the cache memory 25 and writes it into the primary VOL 600 (S104). Here, the CPU 23 migrates the unupdated data (data before being updated (overwritten) with the write data and which is past data that was written in the primary VOL 600) from the primary VOL 600 to the pool VOL 620 (S105). In this specification, the processing of migrating the unupdated data to the pool VOL is referred to as the "snapshot update processing".

When the pair status between the primary VOL 600 and virtual VOL 610 is a split status and internal copying is executed, the respective data configuring the data image of the primary VOL 600 at a certain time are distributed to the primary VOL 600 and pool VOL 620.

Next, the CPU 23 updates the snapshot management information 300 to information for restoring the data image of the primary VOL 600 at the split point based on the data stored in the primary VOL 600 at the point in time when the pair status between the primary VOL 600 and virtual VOL 610 is split (hereinafter referred to as the "split point"), and the data migrated from the primary VOL 600 to the pool VOL 620 after such split point (S106). As a result of this snapshot update processing, the virtual VOL 610 is able to logically retain a snapshot of the primary VOL 600.

When the pair status between the primary VOL 600 and virtual VOL 610 is a split status, the CPU 23 repeatedly executes the foregoing processing steps of S102 to S106 each time it receives a write command from the primary host system 100.

The CPU 23 operates the remote copying execution program 210 after the lapse of a predetermined time from the split point, and thereby executes remote copy processing. The remote copying execution program 210 merges the differential bitmap table 310 to the transfer differential bitmap table 510.

And, based on the transfer differential bitmap table 510, the remote copying execution program 210 determines whether each data for restoring the data image of the primary VOL 600 at the split point exists in the primary VOL 600 or in the pool VOL 620, acquires data from the determined VOL, and transfers such data to the secondary storage controller 50 (S107). As a result of this remote copy processing, the data image of the primary VOL 600 at the split point is reproduced in the secondary VOL 700.

When the secondary storage controller 50 receives data from the primary storage controller 20, it reports the write completion to the primary storage controller 20 (S108).

Incidentally, with the primary storage controller 20, by dual writing the virtual VOL 610, snapshot management information 300, and transfer differential bitmap table 510 in the cache memories 25A, 25B, even if a failure occurs in one of the controllers among the controllers 30, the CPU of the other controller is able to continue performing the internal copy processing, snapshot update processing, and remote copy processing.

Thereafter, when the CPU 63 is to write the data received from the primary storage controller 20 in the secondary VOL 700, it migrates the unupdated data (data before being updated (overwritten) with the write data and which is past data that was written in the primary VOL 700) from the secondary VOL 700 to the pool VOL 720 (S109).

Further, the CPU 63 updates the snapshot management information 400 to information for restoring the data image of the secondary VOL 700 at a split point based on the data stored in the secondary VOL 700 at a split point, and the data migrated from the secondary VOL 700 to the pool VOL 720 after the split point (S110).

Incidentally, the CPU 63 alternately switches and uses the virtual VOLs 710A, 710B. Thereby, for instance, the CPU 63 is able to logically create a snapshot of the secondary VOL 700 in the virtual VOL 710A while clearing the differential bitmap table 410B. The clearance of the differential bitmap tables 410A, 410B requires a long time. By alternately switching and using the virtual VOLs 710A, 710B, this is efficient since the processing for creating the snapshot and the processing for clearing the differential bitmap tables 410A, 410B can be performed in parallel.

The CPU 23 functions as a section (for example, a write section for writing data prior to updating of the primary VOL 600 to the pool VOL 620, a snapshot updating section for updating the snapshot management information 300, a transfer differential bitmap table updating section for updating the transfer differential bitmap table 510, and a remote copy section for remote copying un-transferred data from the primary storage control device 20 to the secondary storage control device 50, etc.) for controlling the primary storage control device 20.

The CPU 23 functions as a section (for example, a writing section for writing data prior to updating of the secondary VOL 700 to the pool VOL 720, and snapshot updating section for updating the snapshot management information 400, etc.) for controlling the secondary storage control device 50.

Incidentally, with the secondary storage controller 50, by dual writing the virtual VOLs 710A, 710B, snapshot management information 400, and transfer differential bitmap table 520 in the cache memories 65A, 65B, even if a failure occurs in one of the controllers among the controllers 60, the CPU of the other controller is able to continue performing the internal copy processing, snapshot update processing, and remote copy processing.

FIG. 5 shows the processing sequence of asynchronous remote copying to be executed in the primary storage controller 20. Time t0 shows the split point when the pair status between the primary VOL 600 and virtual VOL 610 is split. The data image of the primary VOL 600 at time t0 is referred to as the "image T0". The image T0 is the data image in which the data block A is stored in the first block area of the primary VOL 600. At this time t0, the unupdated data is not stored in the pool VOL 620. The snapshot management information 300 is information for restoring the image T0.

At time t1 (in other words, during the split status period), when the data block B is overwritten in the first block area of the primary VOL 600, the data image of the primary VOL 600 changes from the image T0 to the image T1. Here, the internal copy execution program 200 writes the data block A (unupdated data) from the primary VOL 600 in the virtual VOL 620, and updates the snapshot management information 300 to information showing that the first block area of the primary VOL 600 has been updated, and that the data block A (unupdated data) existing in such first block area has been stored in the virtual VOL 620.

Further, at time t1, the control program 220 commands the remote copying execution program 210 to execute remote copy processing. The remote copying execution program 210, by referring to the transfer differential bitmap table 510, specifies that the data block A configuring the image T0 exists in the virtual VOL 610, acquires the data block A from the virtual VOL 610, and transmits the data block A to the secondary storage controller 50.

Time t2 is the point in time when the remote copy processing is completed. As a result, the image T0 formed in the primary VOL 600 at time t0 is replicated in the secondary VOL 700.

Further, at time t2 (in other words, during the split status period), when the data block C is overwritten in the second block area of the primary VOL 600, the data image of the primary VOL 600 changes from the image T1 to the image T2. Here, the internal copy execution program 200 updates the snapshot management information 300 showing that the second block area of the primary VOL 600 has been updated.

For example, when the data block D is overwritten in the second block area of the primary VOL 600 after time t2 and before time t3, the data image of the primary VOL 600 changes from the image T2 to the image T3 (data image in which the data block B exists in the first block area and the data block D exists in the second block area).

Here, the internal copy execution program 200 migrates the data block C (unupdated data) from the primary VOL 600 to the pool VOL 620, and updates the snapshot management information 300 to information showing that the second block area of the primary VOL 600 has been updated, and that the data block C existing in such second block area has been stored in the virtual VOL 620.

Thereafter, before the primary VOL 600 is updated, at time t3, the primary VOL 600 and virtual VOL 610 become a split status once again.

At time t3, in other words, when the status becomes a split status, the CPU 23 deletes all updated data stored in the pool VOL 620 for the purpose of logically retaining the image T3 of the primary VOL 600 in the virtual VOL 610 at such time t3.

Further, the CPU 23 updates the snapshot management information 300 to information for restoring the image T3 from information for restoring the image T0. Specifically, for instance, at time t3, since it is a status where an update has not yet been made in the primary VOL 600, the CPU 23 updates the snapshot management information 300 to information showing that the update has not been made in the primary VOL 600.

When the data block E is overwritten in the second block area of the primary VOL 600 at time t4, the data image of the primary VOL 600 changes from the image T3 to the image T4. Here, the internal copy execution program 200 writes the data block D (unupdated data) from the primary VOL 600 in the virtual VOL 610, and updates the snapshot management information 300 to information showing that the second block area of the primary VOL 600 has been updated, and that the data block D existing in the second block area has been migrated to the pool VOL 620.

Remote copy processing is performed at time t4. The remote copying execution program 210, by referring to the transfer differential bitmap table 510, grasps that the data block B configuring the image T3 exists in the primary VOL 600 since the first block area of the primary VOL 600 has not been updated, and, since the second block area of the primary VOL 600 has been updated, it further grasps that the different data block D configuring the image T3 exists in the pool VOL 620. The remote copying execution program 210 acquires the data block B from the primary VOL 600, further acquires the data block D from the pool VOL 620, and transfers the data block B and data block D to the secondary storage controller 50.

Time t5 is the point in time when the remote copy processing is completed. As a result, the image T0 in the secondary VOL 700 is updated to the image T3 of the primary VOL 600 at time t3. In other words, the data block B is overwritten on the data block A of the first block area of the secondary VOL 700, and the data block D is further overwritten in the second block area of the secondary VOL 700.

Incidentally, thereafter, the secondary storage controller 50 stores the image T3 during the period until it receives the data configuring the image T6 of the subsequent split point t6.

Thereafter, the foregoing processing steps executed at time t3 to time t5 are repeated.

In other words, with the primary storage controller 20, the primary VOL 600 and virtual VOL 610 periodically or irregularly become a split status. During the split status period and up to the point in time until the next split status (in other words, in parallel with the internal copy processing and snapshot update processing), the remote copy processing is executed. After the point in time when this remote copy processing is completed, the primary VOL 600 and virtual VOL 610 become a split status once again, and the unupdated data is deleted from the pool VOL 620.

As a result of repeating the foregoing processing, the data image (in the example of FIG. 5, image T0 at time t0, image T3 at time t3, image T6 at time t6) of the primary VOL 600 at a periodical or irregular split point can be logically retained in the virtual VOL 610, and such data image can be copied to the secondary VOL 700.

FIG. 6 shows the outline of the snapshot update processing pertaining to the present embodiment, and, specifically shows the state where the data image of the primary VOL 600 changes from the image T3 to the image T4, and the image T3 being logically retained by the virtual VOL 610.

The snapshot management information 300 includes a differential bitmap table 310, an address table 320, and a differential data control block 330.

The differential bitmap table 310 has a plurality of bits respectively corresponding to a plurality of block areas (for example, 1 block area is 64K bytes) in the primary VOL 600. For example, when changing from the image T3 to the image T4, as shown in FIG. 6, since the first block area of the primary VOL 600 is not updated, the bit corresponding to this first block area remains to be "0", and the data block E is overwritten on the data block D of the second block area. Thus, the bit corresponding to this second block area is changed from "0" to "1".

The address table 320 has address areas respectively corresponding to the plurality of block areas of the primary VOL 600. If an unupdated data corresponding to a certain block area exists, stored in an address corresponding to such certain block area is an address corresponding to such address area and which is an address in the differential data control block 330.

The differential data control block 330, for example, has management areas respectively corresponding to the plurality of block areas in the pool VOL 620. Each of the management areas records which unupdated data stored in a position corresponding to the block area in the pool VOL 620 is the snapshot data of which generation. The respective differential data control blocks 330 are connected to other differential data control blocks 300 by pointers. In this specification, the queue structure of the differential data control blocks 330 is referred to as a "DDCB queue". For convenience, there are also cases where the differential data control block 330 is referred to as "DDCB". The CPU 23 is able to acquire unupdated data of a plurality of generations by tracking back the management area.

Incidentally, an area not being used by the differential data control block 330 is managed as an empty queue. The empty queue is managed with an empty queue counter 340.

According to the foregoing configuration, the data image of the primary VOL 600 at the point in time a snapshot is created can be logically copied in the virtual VOL 610. And, regarding which data in the virtual VOL 610 is the unupdated data of which generation is managed by the differential data control block 330.

(2) Processing of Write Data in Present Embodiment (2-1) Management Processing of Write Data Using Differential Bitmap Table 310 and Hash Management Table 240 of Present Embodiment Next, the management processing of write data using the differential bitmap table 310 and hash management table 240 in the storage system 10 according to the present embodiment is explained. The storage system 10 of the present embodiment is characterized in that it manages the write data with a block area (first data management unit) and an area that is smaller in comparison to such block area (second data management unit).

Figure 7:
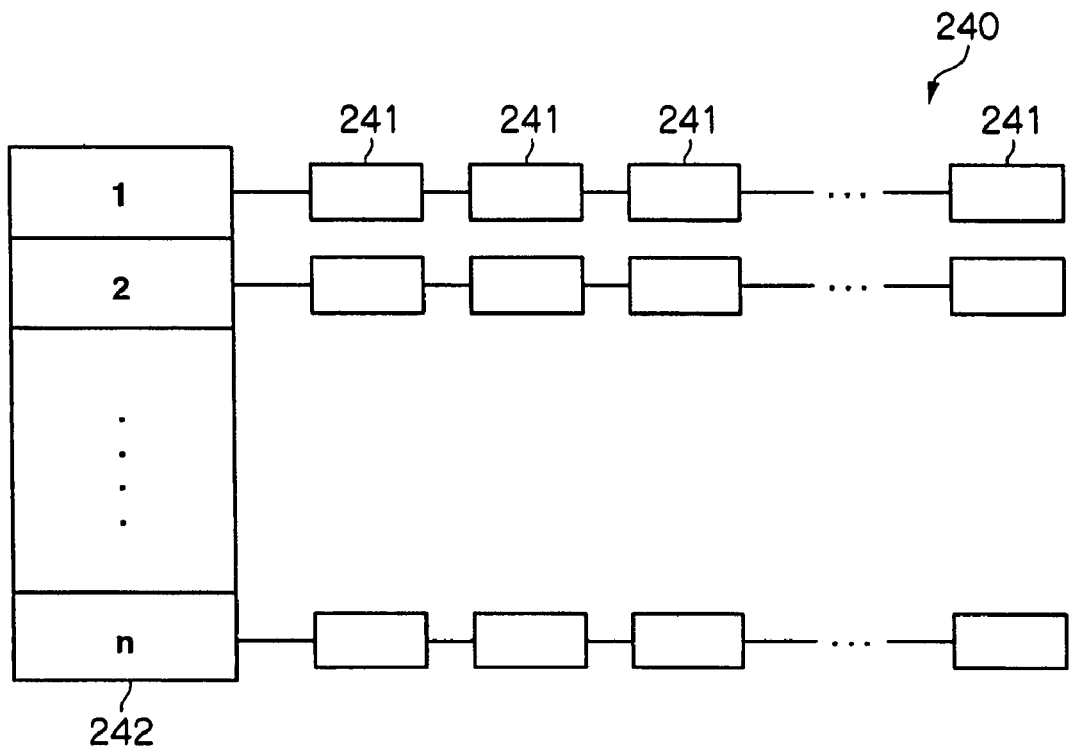
FIG. 7 is a conceptual diagram for explaining the hash management table.

FIG. 7 shows the table configuration of the hash management table 240. The hash management table 240 is configured by management information 241 for managing the write data in an area that is smaller in comparison to the block area (this is hereinafter referred to as a "small block area") (for instance, the minimum unit of one small block area is 512 bytes) being associated in order from the top address of the top address unit 242 for searching such management information 241.

Figure 8:
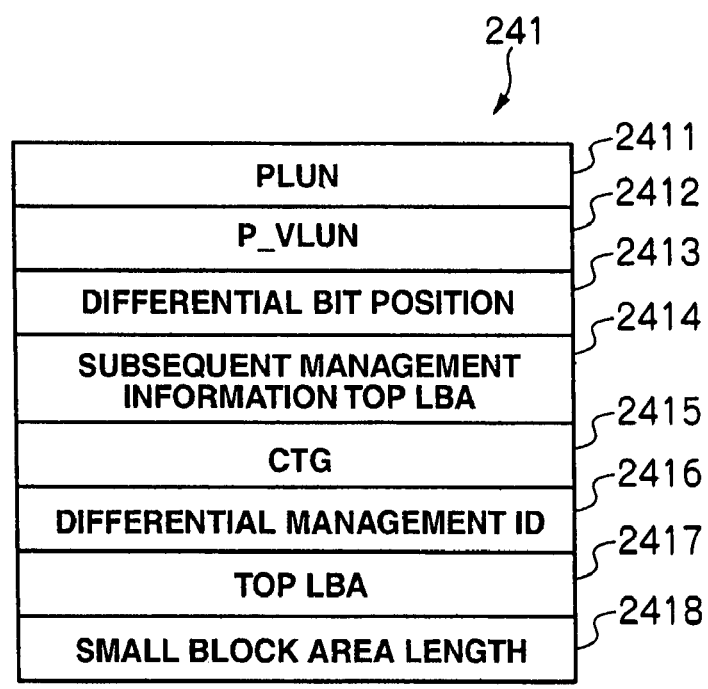
FIG. 8 is a conceptual diagram for explaining management information.

FIG. 8 shows the configuration of the management information 241. The management information 241 stores PLUN 2411 representing a LUN of the primary VOL 600, P_VLUN 2412 representing a LUN of the virtual VOL 610, difference bit position 2413 representing the position of the bit in the differential bitmap table 310, subsequent management information top LBA 2414 representing a top LBA (Logical Brock Address) of a small block area in the block area of the management information 241 to be associated subsequently, CTG 2415 representing the consistency group of the primary VOL 600, difference management ID 2416 representing a difference management ID (Identification) of the hash management table 240, top LBA 2417 representing the top LBA of the small block area in the block area, and small block area length 2418 representing the size of the small block area from the top LBA 2417.

In the hash management table 240, the top address of the top address unit 242 is configured by associating it with the number of the bit position of the differential bitmap table 310.

Further, upon associating the management information 241, the hash management table 240 searches the top address of the top address unit 242 associating the management information from the difference bit position 2413 of the management information 241.

And, the hash management table 240 manages the management information 241 by associating it with the top address of the top address unit 242 searched from the difference bit position 2413 of the management information 241.

Incidentally, if the top address of the same top address unit is searched from the different bit position 2413 of the management information 241 in a state where the management information 241 is associated with the top address of the top address unit 242, the hash management table 240 manages the management information 241 by associating it with the management information 241 associated with the top address of the top address unit 242.

Further, when the top address of the same top address unit 242 is thereafter searched from the difference bit position 2413 of the management information 241, the hash management table 240 manages the management information 241 by associating it with the management information 241 associated at the very end.

Like this, in the hash management table 240, by associating the top address of the top address unit 242 with the number of the bit position of the differential bitmap table 310, the management information 241 can be subject to hash management with the number of the bit position of the differential bitmap table 310, and, as a result, the management information 241 can be subject to efficient load balancing, and hash management can be performed with even higher retrieval performance.

Further, in the hash management table 240, by managing the small block area with the top LBA 2417 and small block area length 2418, in comparison to a case of managing the same with the bitmap table of the small block area, write data can be managed with even less memory capacity.

Figure 9:
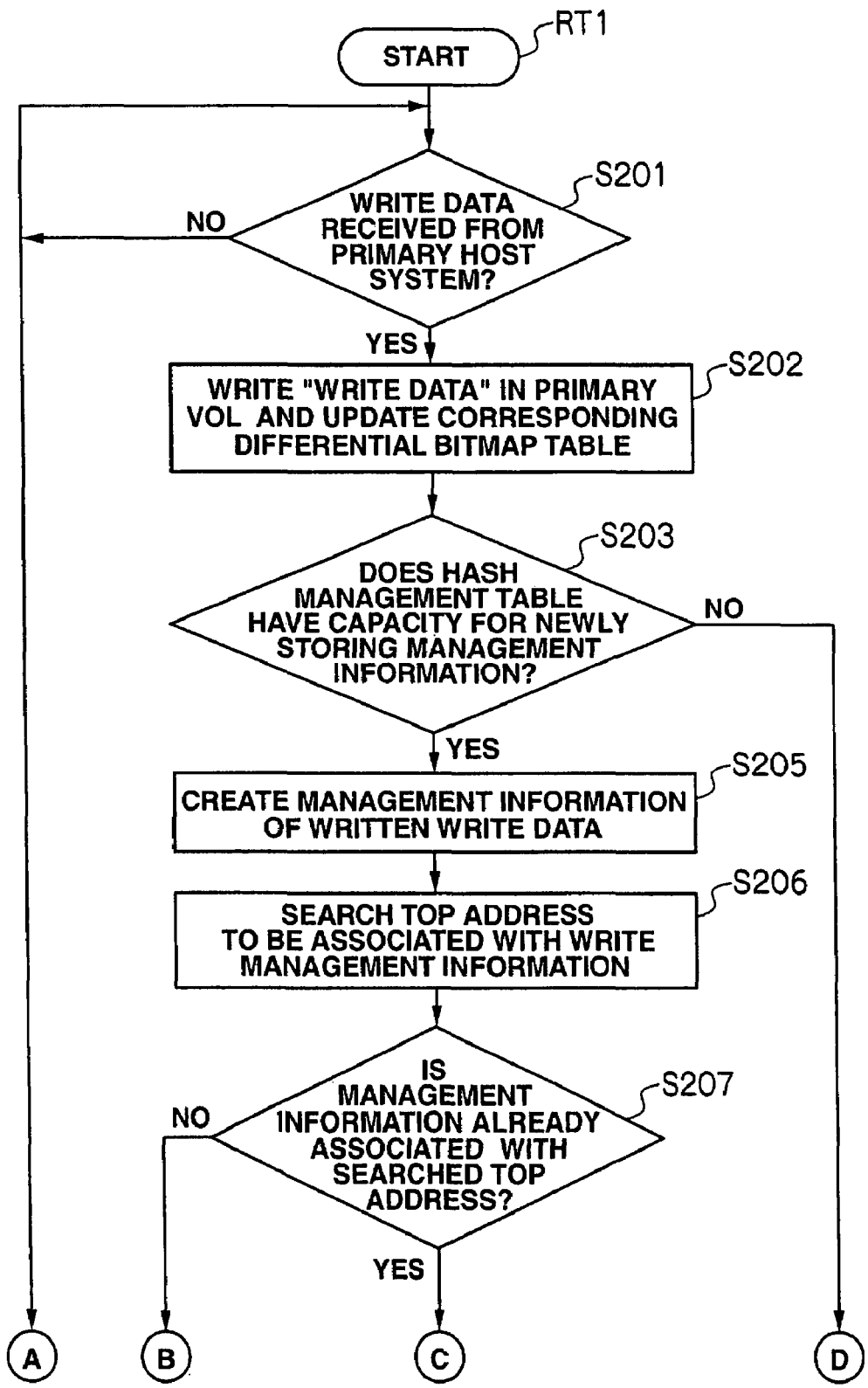
FIG. 9 is a flowchart for explaining the management processing routine of write data.
Figure 10:
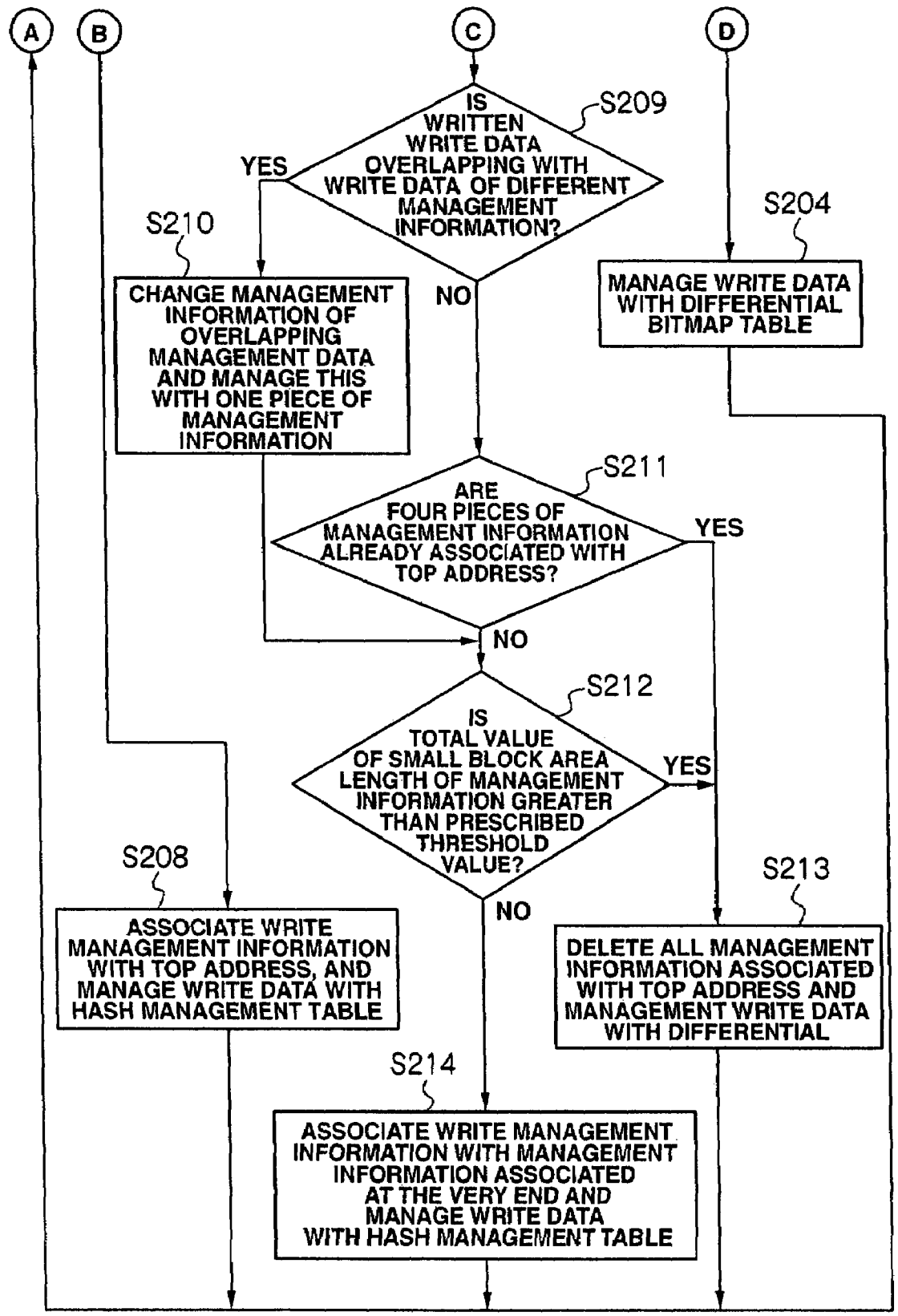
FIG. 10 is a flowchart for explaining the management processing routine of write data.

Here, FIG. 9 and FIG. 10 are flowcharts showing the specific processing routine of the primary storage controller 20 pertaining to the management processing of write data using the differential bitmap table 310 and hash management table 240 in the storage system 10.

The CPU 23, initially, waits in a standby mode for receiving write data from the primary host system 100 according to the write data management processing routine RT1 shown in FIG. 9 and FIG. 10 (S201).

When the CPU 23 eventually receives the write data form the primary host system 100 (S201: YES), it writes the received write data in the primary VOL 600, and updates the bit of the differential bitmap table 310 corresponding to the block area of the written write data from "0" to "1" (S202).

Next, the CPU 23 searches the capacity of the hash management table 240, and checks whether the hash management table 240 has capacity for newly storing the management information 241 of the written write data (S203).

And, when the hash management table 240 does not have capacity for newly storing the management information 241 of the written write data (S203: NO), the CPU 23 manages the written write data with the bit of the differential bitmap 310 corresponding to the block area of the written write data (S204), and thereafter returns to the standby mode once again for waiting to receive the write data from the primary host system 100 (S201).

Meanwhile, when the hash management table 240 does have capacity for newly storing the management information 241 of the written write data (S203: YES), the CPU 23 creates management information 241 of the written write data (this is hereinafter referred to as the "write management information 241") (S205).

Figure 11:
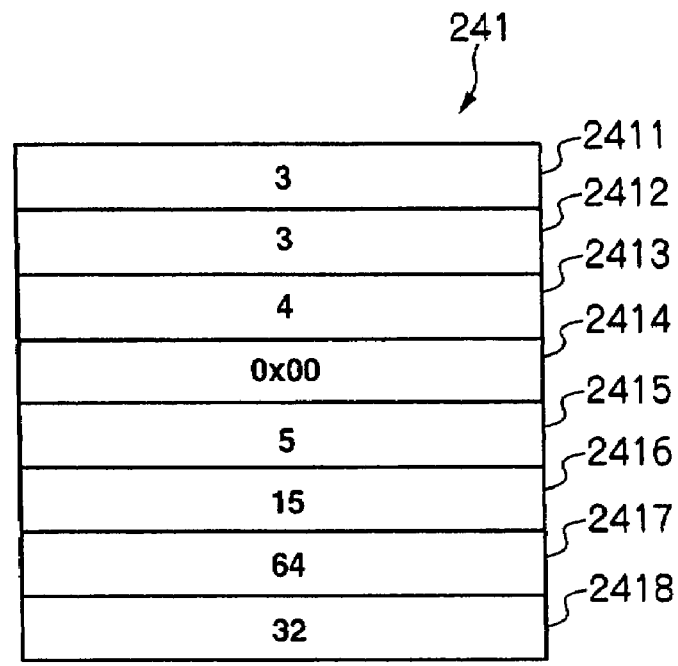
FIG. 11 is a conceptual diagram for explaining management information.

Here, for instance, as shown in FIG. 11, in the write management information 241, let it be assumed that the PLUN 2411 is "3", the P_VLUN 2412 is "3", the difference bit position 2413 is "4", the subsequent management information top LBA 2414 is "0x00", the CTG 2415 is "5", the difference management ID 2416 is "15", the top LBA 2417 is "64" (position of 32K bytes from the top), and the small block area length 2418 is "32" (16K bytes).

Incidentally, "0x00" in the subsequent management information top LBA 2414 of the write management information 241 is the lattermost management information 241 to be associated with the top address of the top address unit 242 in the hash management table 240, and shows that it is not associated with the subsequent management information 241.

Next, the CPU 23 searches the top address of the top address unit 242 to be associated with the write management information 241 from the difference bit position 2413 of the write management information 241 (S206).

Next, the CPU 23 checks whether the different management information 241 has already been associated with the top address of the top address unit 242 searched based on the difference bit position 2413 of the write management information 241 (S207).

And, when the different management information 241 has not been associated with the top address of the top address unit 242 (S207: NO), the CPU 23 associates the write management information 241 with the top address of the top address unit 242, manages the written write data with the top address 2417 of the write management information 241 and the small block area length 2418 in the hash management table 240 (S208), and thereafter returns once again to the standby mode of waiting to receive the write data from the primary host system 100 (S201).

Meanwhile, when the different management information 241 has been associated with the top address of the top address unit 242 (S207: YES), the CPU 23 researches the top LBA 2417 of the different management information 241 and the small block area length 2418, and checks whether the written write data overlaps with the write data being managed with the different management information 241 (S209).

And, when the written write data is overlapping with the write data being managed with the different management information 241 (S209: YES), the CPU 23 researches the top LBA 2417 of the associated different management information 241 and the small block area length 2418, changes the write management information 241 and different management information 241 to be compiled into a single piece of management information 241, and continues managing the written write data with the top address 2417 of the write management information 241 and the small block area length 2418 in the hash management table 240 (S210).

Figure 12:
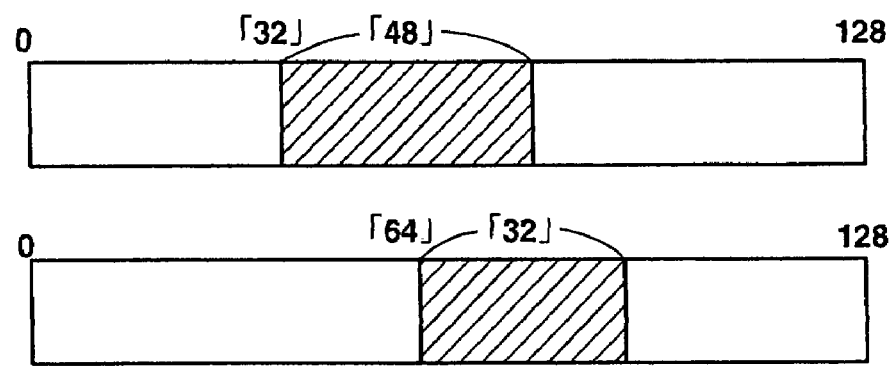
FIG. 12 is a conceptual diagram for explaining the compilation of management information.

For example, when the top LBA 2417 of the different management information 241 already associated with the top address of the top address unit 242 is "32", and the small block area length 2418 is "48", as shown in FIG. 12, this means that the written write data is overlapping with the write data being managed by the management information 241.

Figure 13:
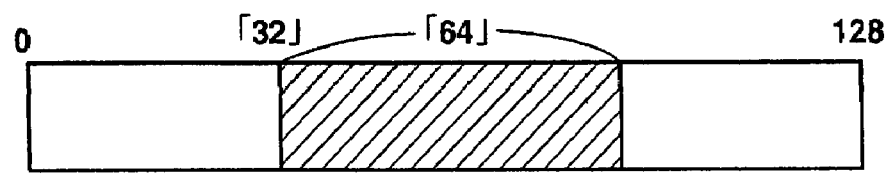
FIG. 13 is a conceptual diagram for explaining the compilation of management information.

Here, as shown in FIG. 13, by changing the small block area length 2418 of the different management information 241 already associated with the top address of the top address unit 242 from "48" to "64", the CPU 23 is able to compile the different management information 241 already associated with the top address of the top address unit 242 and the write management information 241, and manages these as a single piece of management information 241.

Like this, with the CPU 23, when the written write data is overlapping with the write data being managed by the different management information 241 in the hash management table 240, by managing the overlapping the write data with a single piece of management information 241 and not separate pieces of management information 241, write data can be managed with even less memory capacity of the hash management table 240, and, as a result, the memory capacity of the hash management table 240 can be effectively used to improve the transfer efficiency of write data.

Contrarily, when the written write data is not overlapping with the write data being managed by the different management information 241 (S209: NO), the CPU 23 researches the number of pieces of different management information 241 already associated with the top address of the top address unit 242, and checks whether four pieces of different management information 241 have already been associated with the top address of the top address unit 242 (S211).

And, when the number of pieces of different management information 241 already associated with the top address of the top address unit 242 is less than four (S211: NO), the CPU 23 researches the different management information 241 already associated with the top address of the top address unit 242, and the total value of the small block area length 2418 of the write management information 241, and checks whether this total value is greater than a prescribed threshold value (for instance, the threshold value is 48K bytes) (S212).

And, when the total value of the small block area length 2418 is greater than the threshold value (S212: YES), or when the number of pieces of different management information 241 already associated with the top address of the top address unit 242 is four or more (S211: YES), the CPU 23 deletes all management information 241 already associated with the top address of the top address unit 242, manages the written write data with the bit of the differential bitmap 310 corresponding to the block area of the written write data (S204), and thereafter returns once again to the standby mode of waiting to receive the write data from the primary host system 100 (S201).

Like this, with the CPU 23, by deleting, and not managing, all management information 241 of the write data in which the transfer efficiency will not change even if the write data is transferred to the secondary storage controller 50 in the block area, it is possible to manage the write data with even less memory capacity of the hash management table 240, and, as a result, it is possible to improve the transfer efficiency of write data by effectively using the memory capacity of the hash management table 240.

Contrarily, when the total value of the small block area length 2418 is less than the threshold value (S212: NO), the CPU 23 associates the write management information 241 with the lattermost management information 241 associated with the top address of the top address unit 242, and manages the written write data with the top address 2417 of the write management information 241 and the small block area length 2418 in the hash management table 240 (S214).

Here, for example, by changing the subsequent management information top LBA 2414 of the lattermost management information 241 associated with the top address of the top address unit 242 from "0x00" to "16" as the top LBA 2417 of the write management information 241, the CPU 23 is able to associate the write management information 241 with the lattermost management information 241 associated with the top address of the top address unit 242.

And, the CPU 23 thereafter returns once again to the standby mode of waiting to receive the write data from the primary host system 100 (S201).

(2-2) Transfer Processing of Write Data Using Differential Bitmap Table 310 and Hash Management Table 240 in Present Embodiment Next, the transfer processing of write data using the differential bitmap table 310 and hash management table 240 in the storage system 10 according to the present embodiment is explained. The storage system 10 of the present embodiment is characterized in that it transfer the write data to the secondary storage controller 50 with a block area (first data management unit) or an area that is smaller in comparison to such block area (second data management unit).

Figure 14:
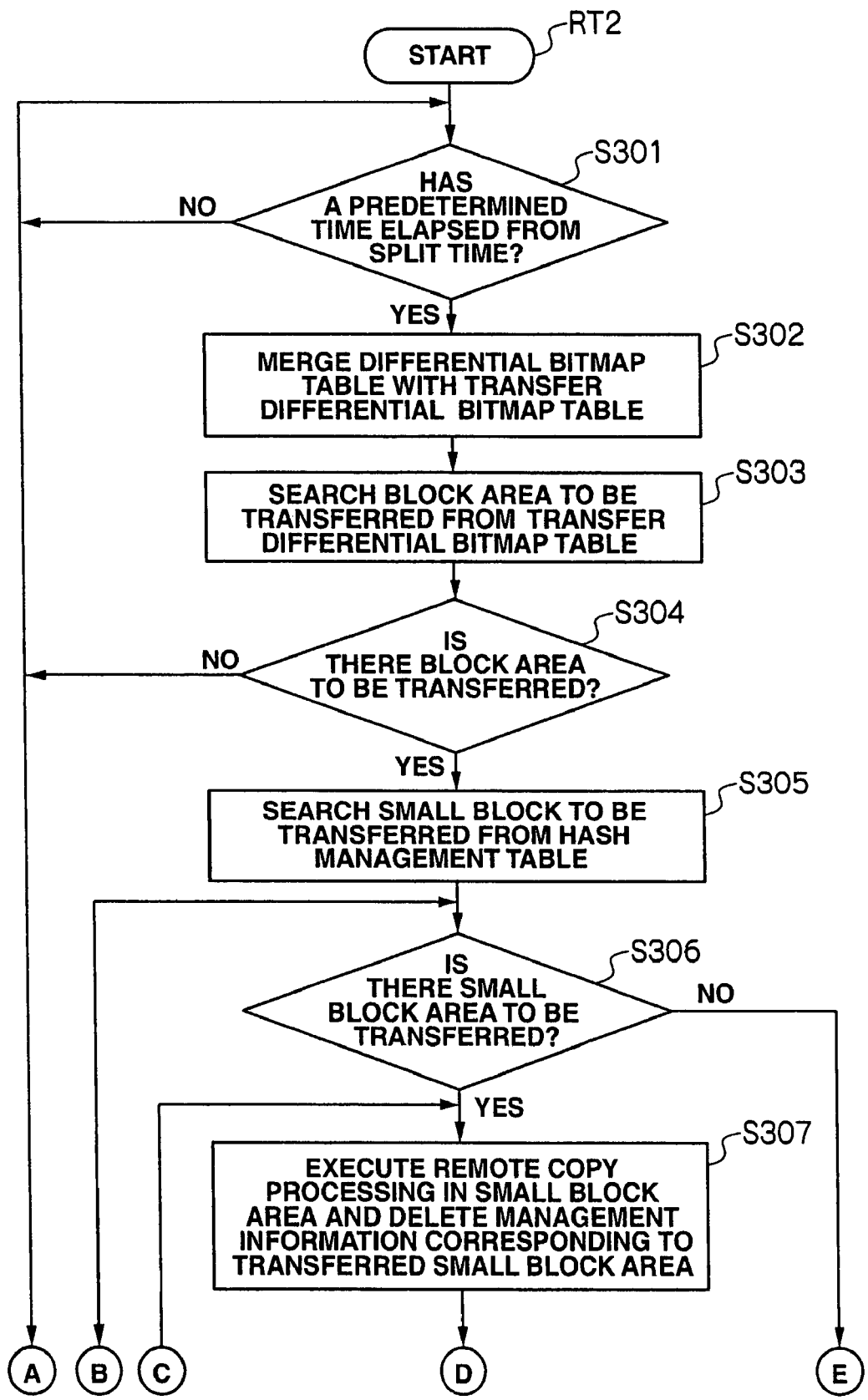
FIG. 14 is a flowchart for explaining the transfer processing routine of write data.
Figure 15:
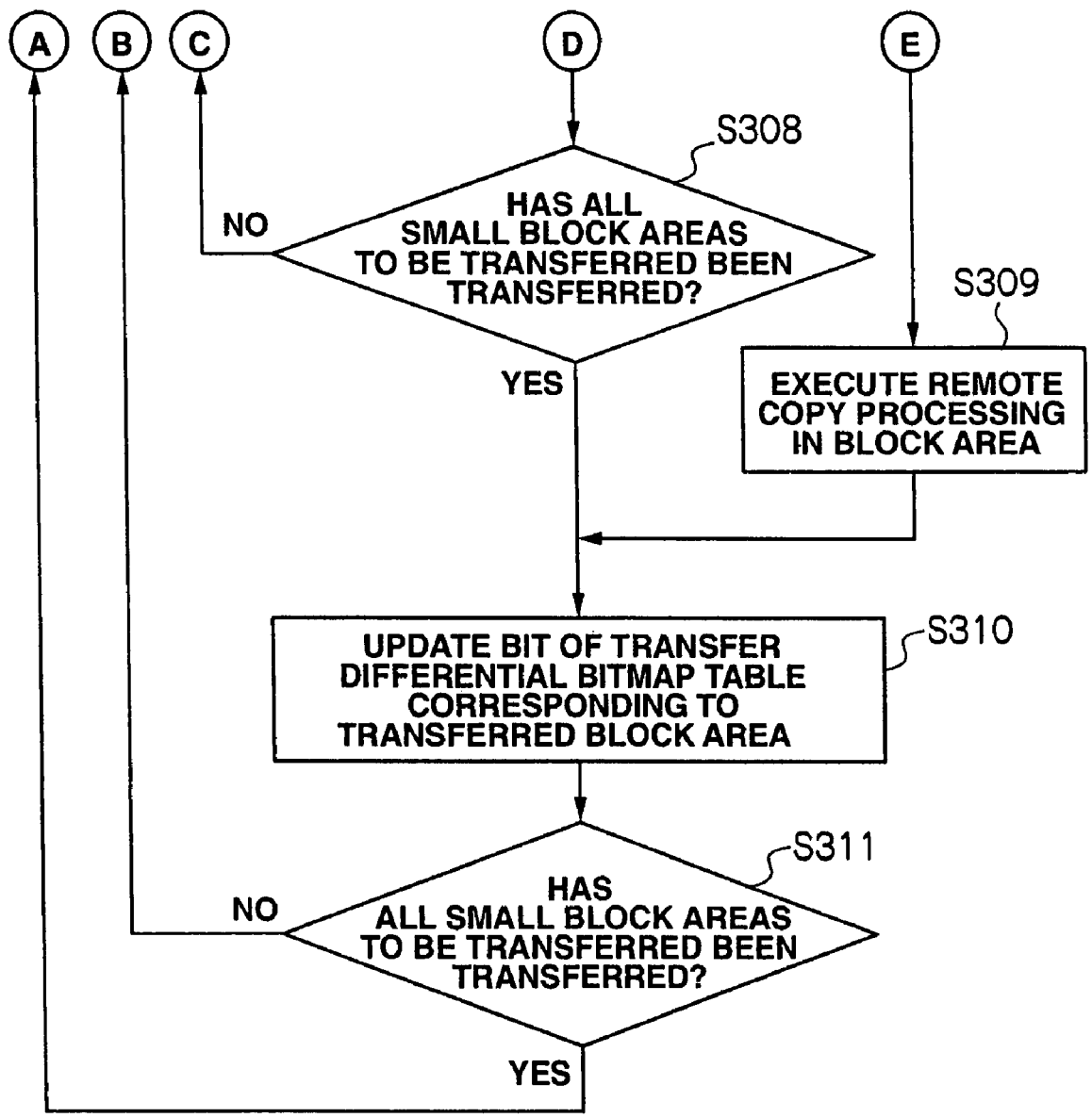
FIG. 15 is a flowchart for explaining the transfer processing routine of write data.

Here, FIG. 14 and FIG. 15 are flowcharts showing the specific processing routine of the primary storage controller 20 and secondary storage controller 50 relating to the transfer processing of write data using the differential bitmap table 310 and hash management table 240 in the storage system 10.

The CPU 23, initially, waits in a standby mode for a predetermined time to lapse from the split point according to the write data transfer processing routine RT2 shown in FIG. 14 (S301).

When a predetermined time eventually elapses from the split point (S301: YES), the CPU 23 operates the remote copying execution program 210 and merges the differential bitmap table 310 to the transfer differential bitmap table 510 (S302).

Next, the CPU 23 searches for the block are to be transferred corresponding to the bit updated to "1" by searching a bit in which the bit of the transfer differential bitmap table 510 has been updated to "1" (S303).

Next, the CPU 23 checks, as the search result upon searching for a bit of the transfer differential bitmap table 510 that has been updated to "1", whether there is a block area to be transferred corresponding to the bit updated to "1" (S304).

And, when there is no block area to be transferred corresponding to the bit updated to "1" (S304: NO), the CPU 23 thereafter returns once again to the standby mode of waiting for a predetermined time to lapse from the split point (S301).

Contrarily, when there is a block area to be transferred corresponding to the bit updated to "1" (S304: YES), the CPU 23 searches for a block to be transferred in the block area to be transferred corresponding to a bit updated to "1" by searching the management information 241 associated with the top address of the top address unit of the hash management table 240 in which the bit of the transfer differential bitmap table 510 has been updated to "1" (S305).

Here, FIG. 14 and FIG. 15 are flowcharts showing the specific processing routine of the primary storage controller 20 and secondary storage controller 50 relating to the transfer processing of write data using the differential bitmap table 310 and hash management table 240 in the storage system 10.

The CPU 23, initially, waits in a standby mode for a predetermined time to lapse from the split point according to the write data transfer processing routine RT2 shown in FIG. 14 (S301).

When a predetermined time eventually elapses from the split point (S301: YES), the CPU 23 operates the remote copying execution program 210 and merges the differential bitmap table 310 to the transfer differential bitmap table 510 (S302).

Next, the CPU 23 searches for the block are to be transferred corresponding to the bit updated to "1" by searching a bit in which the bit of the transfer differential bitmap table 510 has been updated to "1" (S303).

Next, the CPU 23 checks, as the search result upon searching for a bit of the transfer differential bitmap table 510 that has been updated to "1", whether there is a block area to be transferred corresponding to the bit updated to "1" (S304).

And, when there is no block area to be transferred corresponding to the bit updated to "1" (S304: NO), the CPU 23 thereafter returns once again to the standby mode of waiting for a predetermined time to lapse from the split point (S301).

Contrarily, when there is a block area to be transferred corresponding to the bit updated to "1" (S304: YES), the CPU 23 searches for a block to be transferred in the block area to be transferred corresponding to a bit updated to "1" by searching the management information 241 associated with the top address of the top address unit of the hash management table 240 in which the bit of the transfer differential bitmap table 510 has been updated to "1" (S305).

Next, the CPU 23 checks whether there is a small block area to be transferred in the block area to be transferred as the search result of searching the management information 241 associated with the top address of the top address unit of the hash management table 240 in which the bit of the transfer differential bitmap table 510 has been updated to "1" (S306).

And, when there is a small block area to be transferred in the block area to be transferred (S306: YES), the CPU 23 executes the foregoing remote copy processing in the small block area to be transferred in the block area to be transferred and transfers the small block area to be transferred in the block area to be transferred, and thereafter deletes the management information 241 corresponding to the transferred small block area (S307).

Here, for instance, by changing the subsequent management information top LBA 2414 associated with the one before the deleted management information 241 to the subsequent management information top LBA 2414 associated with the one after the deleted management information 241, the CPU 23 is able to associate the management information 241 associated with the one after the deleted management information 241 with the management information 241 associated with the one before the deleted management information 241.

Next, by searching the management information 241 associated with the top address of the top address unit of the hash management table 240 corresponding to the bit position in which the bit of the transfer differential bitmap table 510 has been updated to "1", the CPU 23 checks whether all small block areas to be transferred in the block area to be transferred have been transferred (S308).

And, when all small block areas to be transferred in the block area to be transferred have not been transferred (S308: NO), the CPU 23 executes the foregoing remote copy processing in the small block area to be transferred in the block area to be transferred and transfers the small block area to be transferred in the block area to be transferred, and thereafter deletes the management information 241 corresponding to the transferred small block area (S307).

Meanwhile, when there is no small block area to be transferred in the block area to be transferred (S306: NO), the CPU 23 executes the foregoing remote copy processing in the block area to be transferred (S309).

And, when all small block areas to be transferred in the block area to be transferred have been transferred (S308: YES), or when the foregoing remote copy processing has been executed in the block area to be transferred, the CPU 23 updates the bit of the transfer differential bitmap table 510 corresponding to the transferred block area from "1" to "0" (S310).

Next, the CPU 23 checks whether all block areas to be transferred have been transferred by searching the block area to be transferred in the block area to be transferred corresponding to a bit that has been updated to "1" (S311).

And, when all block areas to be transferred have not been transferred (S311: NO), the CPU 23 checks whether there is a small block area to be transferred in the block area to be transferred (S306).

Contrarily, when all block areas to be transferred have been transferred (S311: YES), the CPU 23 thereafter returns once again to the standby mode of waiting for a predetermined time to elapse from the split point (S301).

Thereafter, the CPU 63 performs the foregoing remote copy processing so as to reproduce the data image of the primary VOL 600 at the split point in the secondary VOL 700, and reports the write completion to the CPU 23.

Further, upon writing the data received from the CPU in the secondary VOL 700, the CPU 63 migrates the unupdated data (data before being updated (overwritten) with the write data and which is past data that was written in the secondary VOL 700) from the secondary VOL 700 to the pool VOL 720.

And, the CPU 63 updates the snapshot management information 400 to information for restoring the data image of the secondary VOL 700 at the split point from the data stored in the second VOL 700 at the split point and the data migrated from the secondary VOL 700 to the pool VOL 720 after the split point.

Incidentally, with the primary storage controller 20, since the virtual VOL 610, snapshot management information 300, and transfer differential bitmap table 510 are dual written in the cache memories 25A, 25B, the hash management table 240 is not written dually since it is stored in the local memory 26.

Therefore, with the primary storage controller 20, when a failure occurs to one of the controllers during remote copy processing, the CPU of the other controller will continue to execute such remote copy processing. Here, the CPU of the other controller is able to execute the foregoing remote copy processing in the transferred block area by referring only to the transfer differential bitmap table 310, and without having to refer to the hash management table 240.

Further, with the primary storage controller 20, when a failure occurs to one of the controllers during remote copy processing and the CPU of the other controller newly receives write data from the primary host system 100, and the management information 241 is stored in the hash management table 240, all management information 241 is deleted, and, from such point in time onward, the CPU of the other controller is able to execute the management processing and transfer processing using the differential bitmap table 310 and hash management table 240.

Meanwhile, with the primary storage controller 20, when the failure of one of the controllers is recovered thereafter, in order to prevent discrepancies from the occurrence of a failure to the recovery thereof, the foregoing remote copy processing is executed in the transferred block area by the CPU of one controller referring only to the transfer differential bitmap table 310 without referring to the hash management table 240.

Further, with the primary storage controller 20, in a case where the failure of one of the controllers is recovered, and the CPU of the pertinent controller newly receives write data from the primary host system 100, and the management information 241 is stored in the hash management table 240, all management information 241 is deleted, and, from such point in time onward, the CPU of the one controller is able to execute the management processing and transfer processing using the differential bitmap table 310 and hash management table 240.

Like this, the storage system 10 is able to manage write data of the block area with the bit of the differential bitmap table 310, and manage write data of an area that is smaller in comparison to the block area with the management information 241 of the hash management table 240.

Therefore, with the storage system 10, when the write data to be transferred to the secondary storage controller 50 in the block area is small, the traffic of write data can be reduced by executing remote copy processing in the small block area, and, when the write data to be transferred to the secondary storage controller 50 in the block area is large, the memory capacity of the hash management table 240 can be reduced by executing the remote copy processing in the block area. As a result, in addition to effectively preventing the increase in memory capacity, it is also possible to dramatically improve the transfer efficiency of data.

Incidentally, in the present embodiment, although a case was explained where write data is managed with the block area (first data management unit) and an area that is smaller in comparison to such block area (second data management unit), the present invention is not limited thereto, and, for instance, write data may be managed with three or more data management units.

Further, in the present embodiment, although a case was explained where one block area is "64K bytes", and the minimum unit of one small block area is "512 bytes", the present invention is not limited thereto, and, for instance, one block area may be "64K bytes", and the minimum unit of one small block area may be "8K bytes", and block areas and small block areas in various other sizes can be managed.

Moreover, in the present embodiment, although a case was explained where all management information 241 already associated with the top address of the top address unit 242 is deleted, and the threshold value for managing the written write data with the bit of the differential bitmap 310 corresponding to the block area of the written write data is set to "48K bytes", the present invention is not limited thereto, and, for example, the threshold value may also be set to "32K bytes", and a threshold value in various other sizes can be used.

Further, in the present embodiment, although a case was explained where all management information 241 already associated with the top address of the top address unit 242 is deleted when there are four pieces of different management information 241 already associated with the top address of the top address unit 242, and managing the written write data with the bit of the differential bitmap 310 corresponding to the block area of the written write data, the present invention is not limited thereto, and, for instance, the number of pieces of different management information 241 may be four or more, or a number greater than four, and various other numbers may be used.

(3) Priority Execution Processing of Command Job in Present Embodiment

Next, the priority execution processing of a command job in the storage system 10 according to the present embodiment is explained. The storage system 10 of the present embodiment is characterized in that it sets the priority of command jobs, arranges and stores the command jobs according to such priority, and executes the command jobs in the arranged order according to the setting based on priority.

Figure 16:
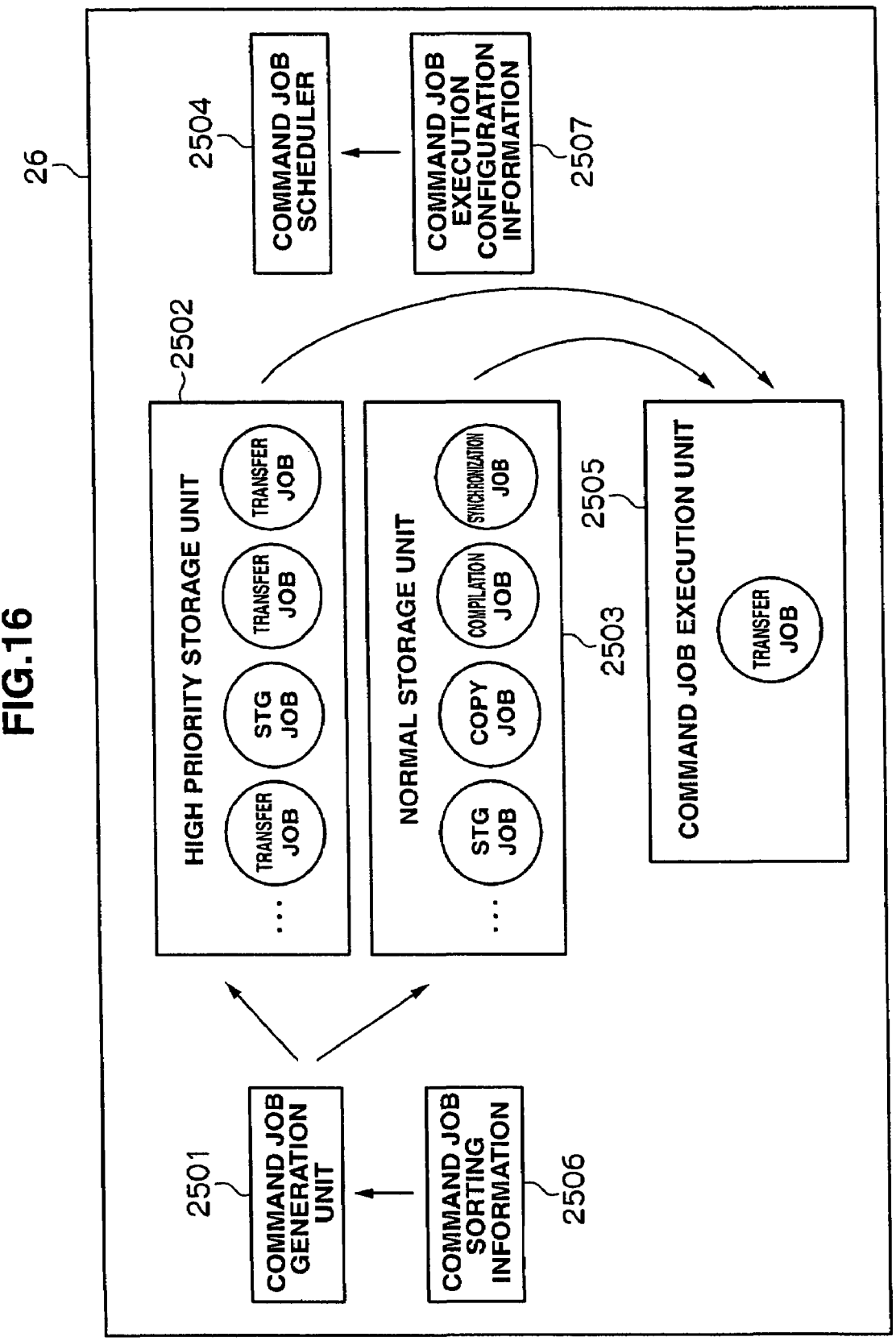
FIG. 16 is a conceptual diagram for explaining the priority execution processing of a command job.

FIG. 16 shows a schematic diagram of the command job priority execution processing to be performed based on the execution of the command job priority execution program 250 by the CPU 23. The CPU 23, by executing the command job priority execution program 250, expands a job generation unit 2501, a high priority storage unit 2502, a normal storage unit 2503, a command job scheduler 2504, a command job execution unit 2505, command job sorting information 2506, and command job execution configuration information 2507 in a local memory 26.

Figure 17:
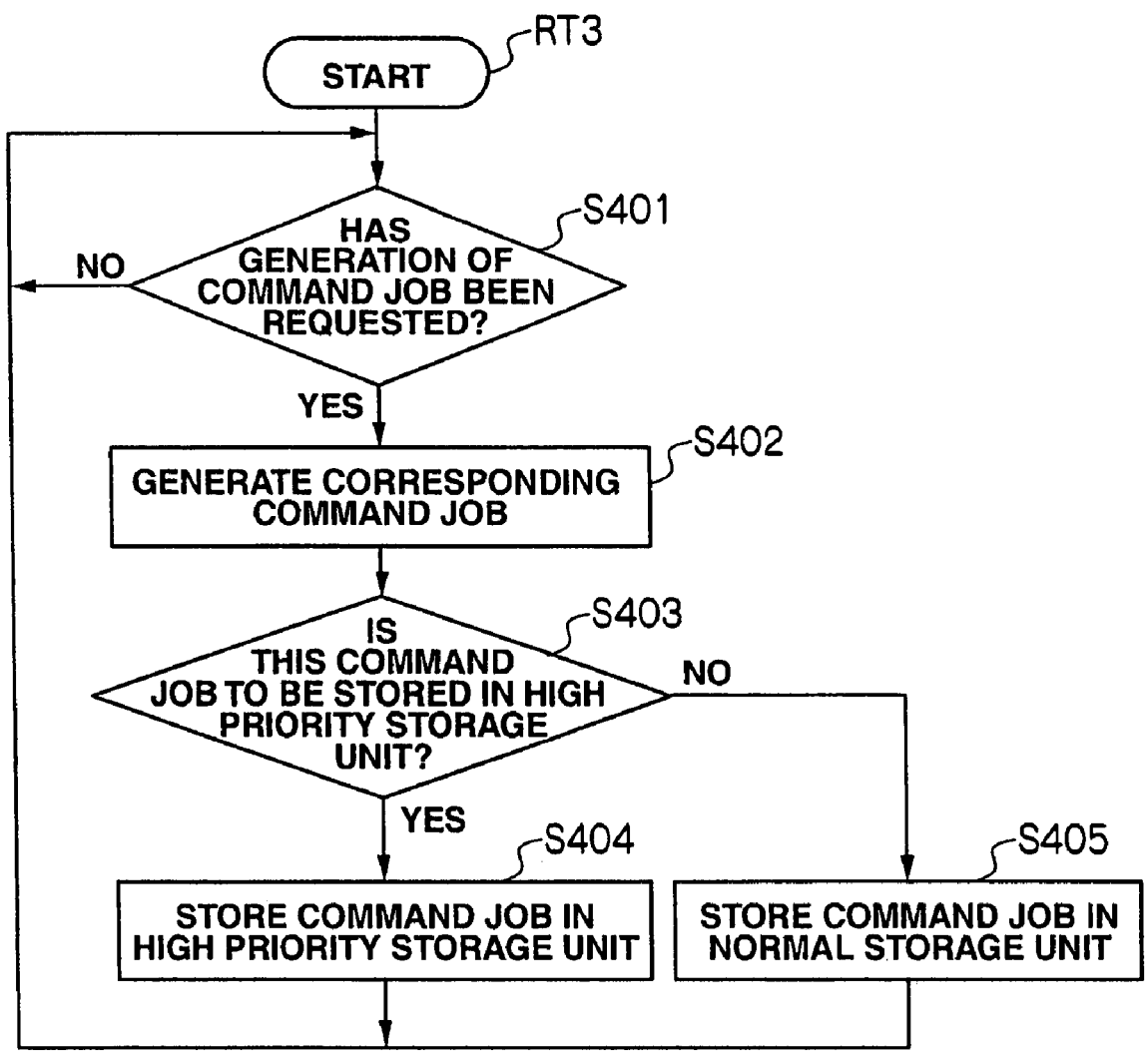
FIG. 17 is a flowchart for explaining the storage processing routine of a command job.

Here, FIG. 17 is a flowchart showing the specific processing routine of the primary storage controller 20 relating to the storage processing of command jobs in the storage system 10.

The CPU 23, initially, based on the read command or write command, execution request of remote copy processing, execution request of internal copy processing and so on from the primary host system 100, checks whether a generation request of a command job as a job for the CPU 23 to execute these operations has been received by the job command generation unit 2501 according to the command job storage processing routine RT3 shown in FIG. 17 (S401).

And, when the generation request of a command job has not been received by the job command generation unit 2501 (S401: NO), the CPU 23 waits in a standby mode for the generation request of a command job to be received by the job command generation unit 2501.

Meanwhile, when the generation request of a command job has been received by the job command generation unit 2501 (S401: YES), the CPU 23 generates a command job corresponding to the foregoing access or request in the job command generation unit 2501 (S402).

Next, the CPU 23 checks whether the generated command job is to be stored in the high priority storage unit 2502 by referring to the command job sorting information 2506 in the job command generation unit 2501 (S403).

Here, the high priority storage unit 2502 stores command jobs having a "high" priority among the command jobs, and stores such command jobs in order from the oldest to newest.

Further, the normal storage unit 2503 stores command jobs having a "medium" priority among the command jobs, and stores such command jobs in order from the oldest to newest.

Specifically, the high priority storage unit 2502 and normal storage unit 2503 are systems having a function like a FIFO (First In First Out) buffer where the stored command jobs are extracted in order from the oldest to newest, and the command job stored most recently is extracted last.

Further, the command job sorting information 2506 sets the priority of command jobs, and is information representing which command jobs among the command jobs are to be sorted and stored in the high priority storage unit 2502, and which command jobs are to sorted and stored in the normal storage unit 2503.

Specifically, the command job sorting information 2506, for instance, is made to realize that the "data transfer job (transfer job)" for performing remote copy processing and the "staging job (STG job)" of the data transfer job among the command jobs are command jobs of "high" priority, and other command jobs are command jobs of "medium" priority.

And, when the CPU 23 is to store the generated command job in the high priority storage unit 2502 upon referring to the command job sorting information 2506 in the job command generation unit 2501 (S403: YES), the CPU 23 stores the generated command job in the high priority storage unit 2502 by placing it at the very end of the command jobs that are already arranged in the high priority storage unit 2502 from the oldest to newest (S404).

Meanwhile, when the CPU 23 is to store the generated command job in the normal storage unit 2503 upon referring to the command job sorting information 2506 in the job command generation unit 2501 (S403: NO), the CPU 23 stores the generated command job in the normal storage unit 2503 by placing it at the very end of the command jobs that are already arranged in the normal storage unit 2503 from the oldest to newest (S405).

For instance, when the generated command job is a "data transfer job", the CPU 23 stores the "data transfer job" in the high priority storage unit 2502 by placing it at the very end of the command jobs that are already arranged in the high priority storage unit 2502 from the oldest to newest, and, when the generated command job is a "compilation job", the CPU 23 stores the "compilation job" in the normal storage unit 2503 by placing it at the very end of the command jobs that are already arranged in the normal storage unit 2503 from the oldest to newest.

Eventually, the CPU 23 thereafter checks once again whether the generation request of a command job has been received by the job command generation unit 2501 (S401).

Figure 18:
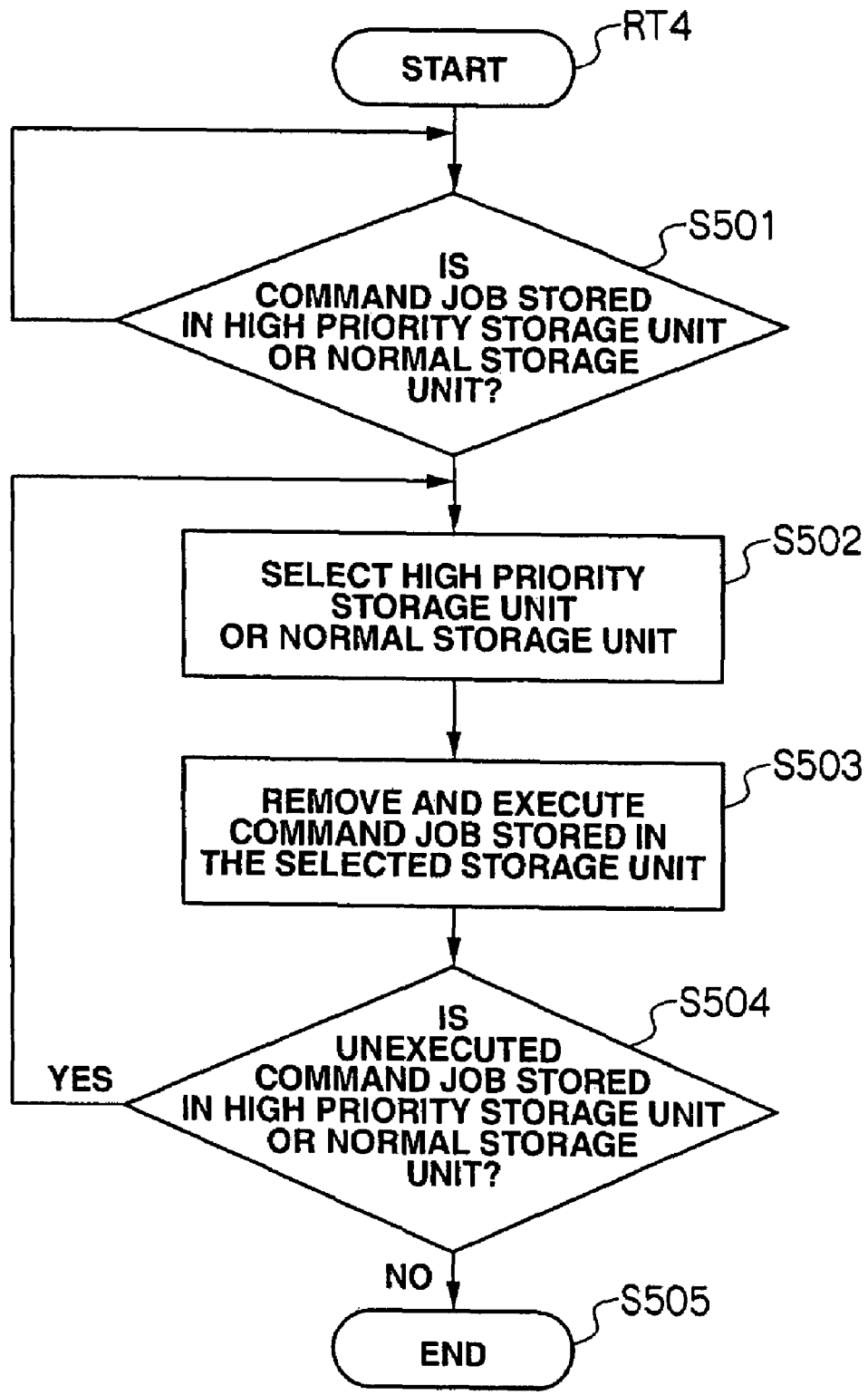
FIG. 18 is a flowchart for explaining the priority execution processing routine of a command job.

Further, FIG. 18 is a flowchart showing the specific processing of the primary storage controller 20 relating to the priority execution processing of command jobs in the storage system 10.

The CPU 23, initially, checks whether a command job is stored in the high priority storage unit 2502 or normal storage unit 2503 in the command job scheduler 2504 according to the command job priority execution processing routine RT4 shown in FIG. 18 (S501).

And, when a command job is not stored in the high priority storage unit 2502 or normal storage unit 2503 (S501: NO), the CPU 23 waits in a standby mode for a command job to be stored in the high priority storage unit 2502 or normal storage unit 2503.

Meanwhile, when a command job is stored in the high priority storage unit 2502 or normal storage unit 2503 (S501: YES), the CPU 23 selects to extract the command job from either the high priority storage unit 2502 or normal storage unit 2503 by referring to the command job execution configuration information 2507 in the command job scheduler 2504, and sends the oldest stored command job to the command job execution unit 2505 (S502).

Here, the command job scheduler 2504 selects to extract the command job from either the high priority storage unit 2502 or normal storage unit 2503, and sends the oldest command job stored in the selected storage unit to the command job execution unit 2505.

Further, each time the execution of a command job with the command job execution unit 2505 is ended, the command job scheduler 2504 similarly selected either the high priority storage unit 2502 or normal storage unit 2503 as described above, and sends the command job to the command job execution unit 2505.

The command job execution configuration information 2507 is information representing whether the command job stored in the high priority storage unit 2502 is to be extracted and sent to the command job execution unit 2505, or the command job stored in the normal storage unit 2503 is to be extracted and sent to the command job execution unit 2505.

Specifically, the command job execution configuration information 2507, for instance, is made to execute, at "2:1", the process of extracting the command job stored in the high priority storage unit 2502 and sending it to the command job execution unit 2505, and the processing of extracting the command job from the normal storage unit 2503 and sending it to the command job execution unit 2505.

In other words, when the CPU 23 sends the two oldest command jobs stored in the high priority storage unit 2502 in the command job scheduler 2504, the CPU 23 then sends one oldest command job stored in the normal storage unit 2503.

Next, the CPU 23 executes the command job sent from the command job scheduler 2504 in the command job execution unit 2505 (S503).

Next, the CPU 23 checks whether an unexecuted command job is still stored in the high priority storage unit 2502 or normal storage unit 2503 in the command job scheduler 2504 (S504).

And, when an unexecuted command job is still stored in the high priority storage unit 2502 or normal storage unit 2503 (S504: YES), the CPU 23 thereafter once again selects a command job from the high priority storage unit 2502 or normal storage unit 2503 by referring to the command job execution configuration information 2507 in the command job scheduler 2504, and sends this to the command job execution unit 2505 (S502).

Meanwhile, when an unexecuted command job is not stored in the high priority storage unit 2502 or normal storage unit 2503 (S504: NO), the CPU 23 thereafter ends this command job priority execution processing routine RT4 (S505).

Incidentally, when a command job is not stored in the high priority storage unit 2502 in the command job scheduler 2504, the CPU 23 extracts the command job of the normal storage unit 2503 and sends it to the command job execution unit 2505 until a command job is newly stored in the high priority storage unit 2502, and, when a command job is not stored in the normal storage unit 2503, the CPU 23 extracts a command job of the high priority storage unit 2502 and sends it to the command job execution unit 2505 until a command job is newly stored in the normal storage unit 2503.

And, when a command job is stored in the high priority storage unit 2502 and normal storage unit 2503, the CPU 23 refers to the command job execution configuration information 2507 in the command job scheduler 2504.

Like this, with the storage system 10, by providing a high priority storage unit 2502, setting the priority of command jobs, storing command jobs having "high" priority in the high priority storage unit 2502, and preferentially executing the "high" priority command job according to the command job execution configuration information 2507, even when the CPU 23 is in an overloaded state, it is possible to effectively prevent a situation where a command job that must be preferentially executed for maintaining the processing performance of the primary storage controller 20 not being executed, and, as a result, the processing performance of the primary storage controller 20 can be maintained a balanced manner.

Further, with the storage system 10, by storing the "data transfer job" and its "staging job" in the high priority storage unit 2502, and preferentially executing the "data transfer job" and its "staging job" according to the command job execution configuration information 2507, even when the CPU 23 is in an overloaded state, the access processing performance from the primary host system 100 and the data transfer performance to the secondary storage controller 50 can be maintained in a balanced manner.

Incidentally, in the present embodiment, although a case was explained where the command job sorting information 2506 was set such that the "data transfer job (transfer job)" and the "staging job (STG job)" of the data transfer job are made to be "high" priority command jobs, and the other command jobs are made to be "medium" priority command jobs, the present invention is not limited thereto, and, for instance, the "copy job" may be made to be a "high" priority command job, and the priority of various command jobs can be set or changed freely.

Further, in the present embodiment, although a case was explained where the two command jobs; namely, a "high" priority command job and a "medium" priority command job are sorted to corresponding storage units based on the command job sorting information 2506, the present invention is not limited thereto, and three command jobs; namely, a "high" priority command job, "medium" priority command job, and "low" priority command job may be sorted to corresponding storage units. In addition, after the preferential sorting, the number of corresponding storage units may be set to three or more, and the foregoing jobs may be respectively sorted to the corresponding storage units.

Moreover, in the present embodiment, although a case was explained of referring to the command job execution configuration information 2507 so as to execute, at "2:1", the process of extracting the command job stored in the high priority storage unit 2502 and sending it to the command job execution unit 2505, and the processing of extracting the command job from the normal storage unit 2503 and sending it to the command job execution unit 2505, the present invention is not limited thereto, and, for instance, the execution may be made in a ratio other than "2:1" such as "3:1" or "5:2", or various other methods other than the foregoing ratio may be used for selecting whether to extract the command job from the high priority storage unit 2502 or normal storage unit 2503.

Like this, with the storage system 10, by freely setting and changing the command job sorting information 2506 and command job execution configuration information 2507, the processing performance of the primary storage controller 20 can be maintained in an even more balanced manner.

(4) Transmission/Reception Processing of Compilation Communication Command in Present Embodiment Next, the transmission/reception processing of the compiled communication command in the storage system 10 according to the present embodiment is explained. The storage system 10 of the present embodiment is characterized in that it compiles the same types of command commands in the storage controller of the communication source into a single compiled communication command, transmits this to the storage controller of the communication destination, divides the compiled communication command into individual communication commands in the storage controller of the communication destination, executes processing to the individual communication commands, transmits the processing result of the compiled communication command to the storage controller of the communication source, and executes processing to the transmitted processing result in the storage controller of the communication source.

Figure 19:
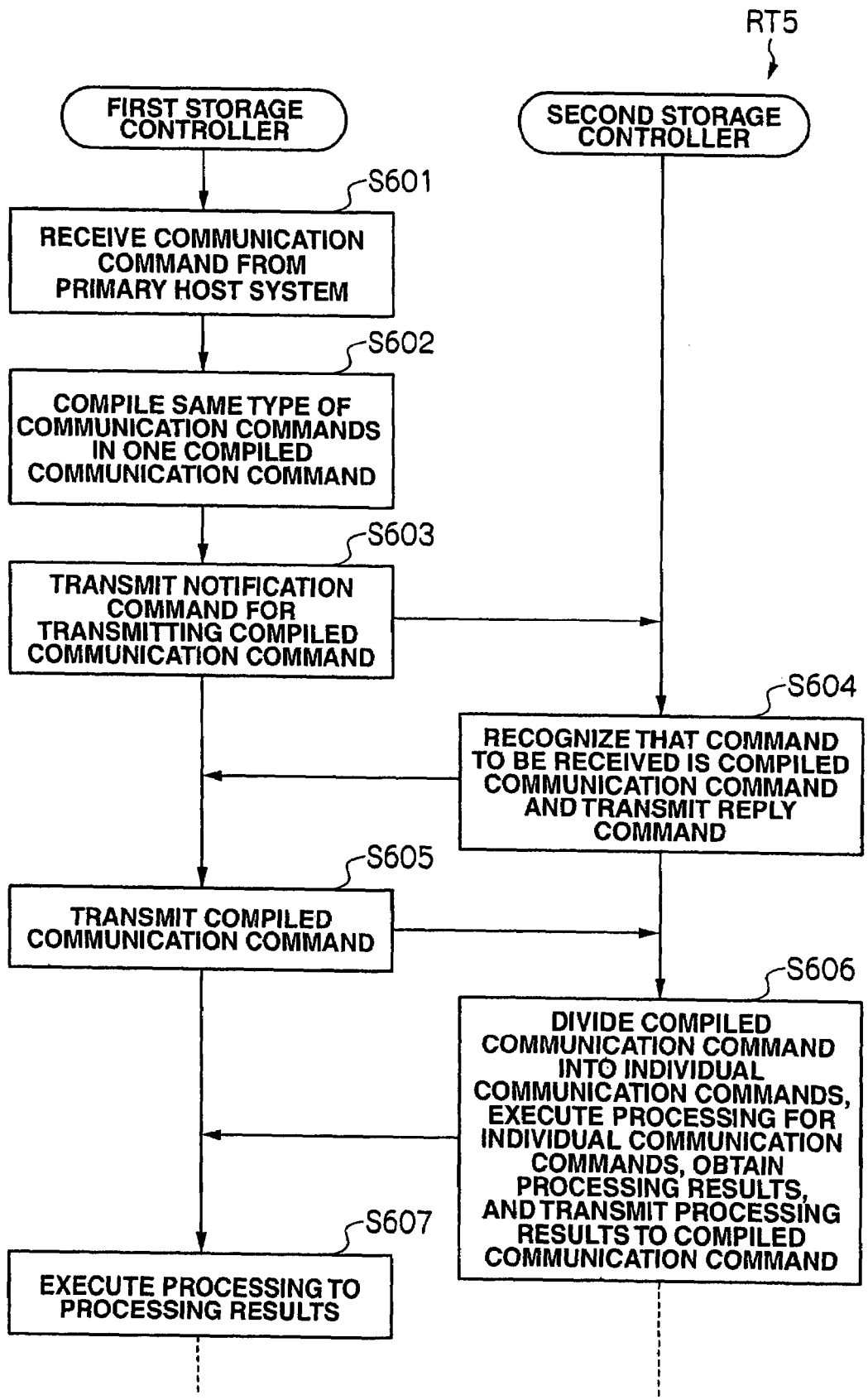
FIG. 19 is a flowchart for explaining the transmission/reception processing routine of a compiled communication command.

Here, FIG. 19 is a flowchart showing the specific processing routine of the primary storage controller 20 and secondary storage controller 50 relating to the transmission/reception processing of the compiled communication command to be performed by the CPU 23 and CPU 63 executing the collective communication execution program 260.

The CPU 23, initially, receives a plurality of communication commands relating to the communication control with the secondary storage controller 50 from the primary host system 100 according to the compiled communication command transmission/reception processing RT5 shown in FIG. 19 (S601).

Figure 20:
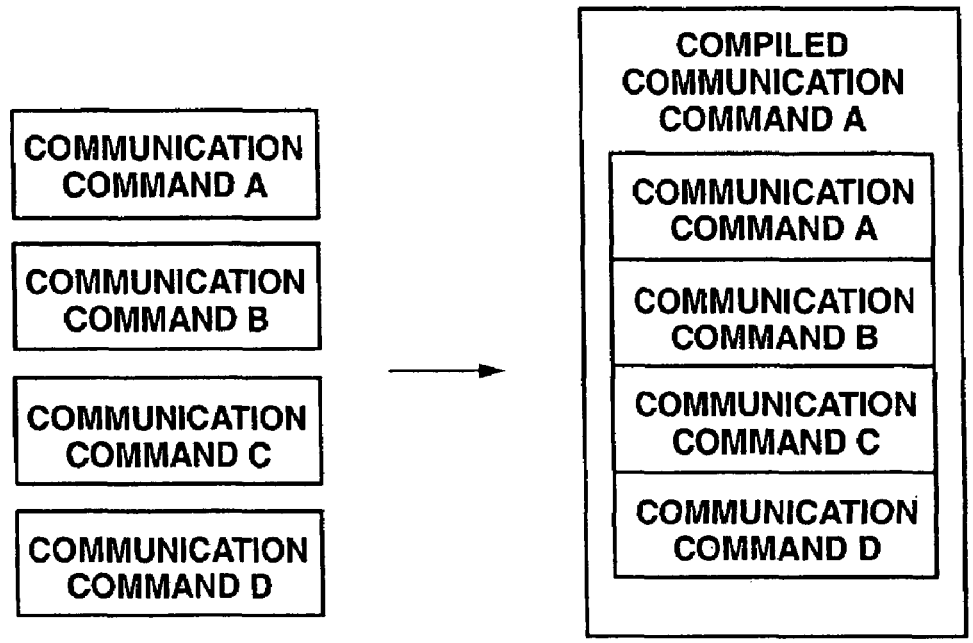
FIG. 20 is a conceptual diagram for explaining the communication command compilation processing.

Next, when the communication command A, communication command B, communication command C, and communication command D are the same type of communication commands among the plurality of communication commands, as shown in FIG. 20, the CPU 23 compile the same type of communication commands A to D into a single compiled communication command M by arranging the respective communication command A, communication command B, communication command C, and communication command D into a list (S602).

Here, for example, the communication commands A to D are the four split commands for making all four secondary VOLs 700 in a pair status with the primary VOL 600 into a split status.

Next, the CPU 23 generates a notification command for transmitting the compiled communication command M, and transmits this notification command to the secondary storage controller 50 (S603).

Next, when the CPU 63 receives the notification command from the primary storage controller 20, it recognizes that the communication command to be received subsequently is a compiled communication command, generates a reply command recognizing that the communication command to be subsequently received is a compiled communication command, and transmits this reply command to the secondary storage controller 50 (S604).

Next, when the CPU 23 receives the reply command from the secondary storage controller 50, it transmits the compiled communication command M to the secondary storage controller 50 (S605).

Next, when the CPU 63 receives the compiled communication command M from the primary storage controller 20, it divides the compiled communication command M into individual communication commands A to D, executes processing to each of these communication commands A to D, obtains the processing result of each processing, and transmits the processing result of the compiled communication command M (S606).

Figure 21:
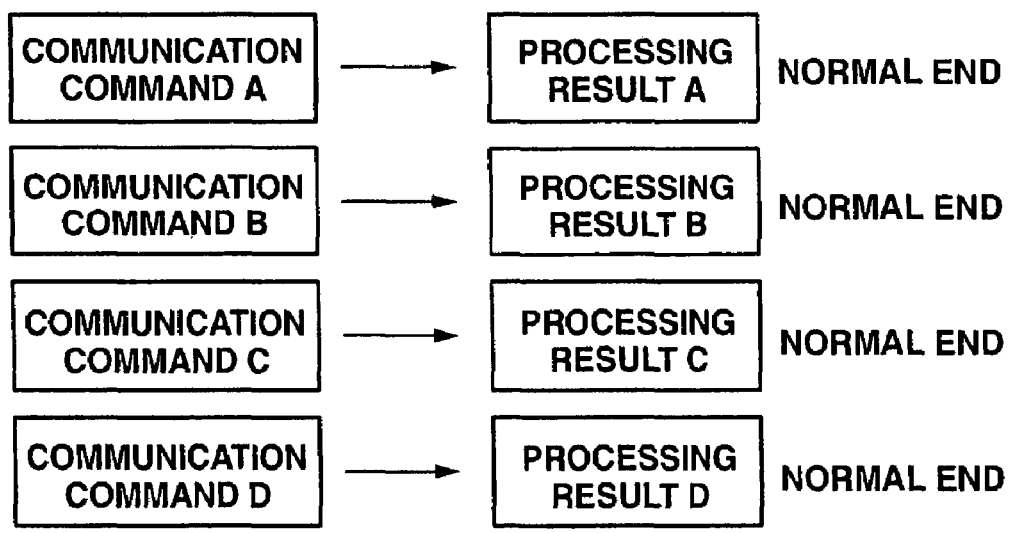
FIG. 21 is a conceptual diagram for explaining the communication command compilation processing.

Here, as shown in FIG. 21, for example, when the processing results A to D of each processing all end in a normal end, as the processing result of the compiled communication command M, the CPU 63 transmits to the secondary storage controller 50 the "normally ended" processing result D, which is the processing result of the communication command D as the last communication command in the compiled communication command M.

Figure 22:
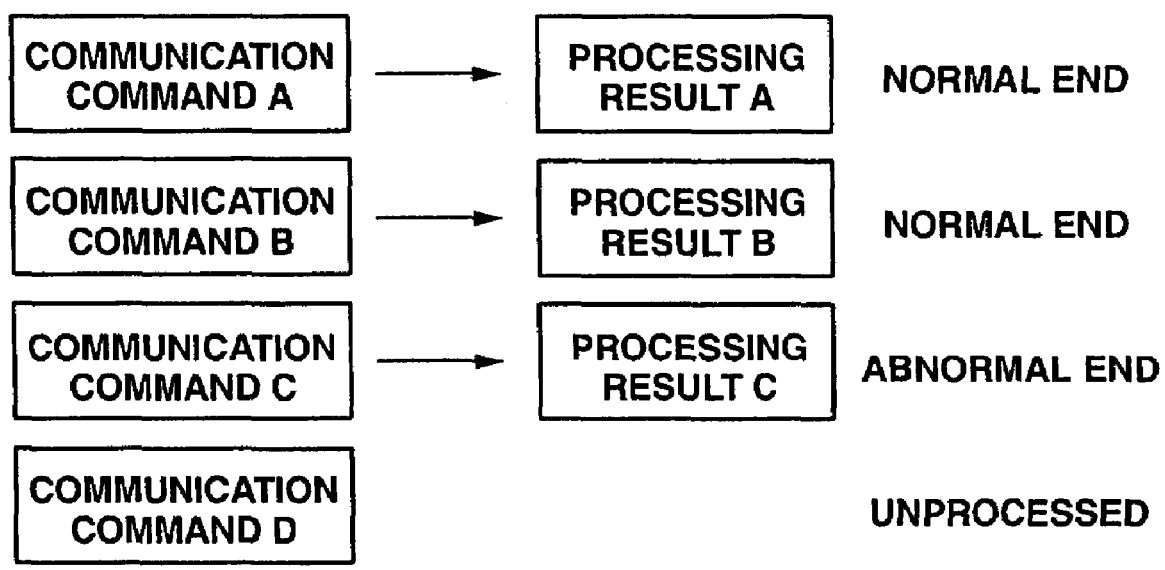
FIG. 22 is a conceptual diagram for explaining the communication command compilation processing.

Further, as shown in FIG. 22, for example, when the processing result C as the processing result of the communication command C ends abnormally, the CPU 63 abandons the processing of the unexecuted communication command D, and transmits to the secondary storage controller 50 the "abnormally ended" processing result C as the processing result of the compiled communication command M.

Next, when the CPU 63 receives the processing result of the compiled communication command M from the secondary storage controller 50, it executes the processing to the received processing result (S607).

Here, for instance, when all processing results A to D of each processing end normally and the CPU 63 receives the "normally ended" processing result D as the processing result of the compiled communication command M, it confirms the last communication command in the compiled communication command M, and, since this communication command is the communication command D, determines that the compiled communication command M ended normally, and, for example, executes the transmission/reception processing of the subsequent compiled communication command.

Further, for instance, when the processing result C as the processing result of the communication command C abnormally ended and the CPU 63 receives the "abnormally ended" processing result C as the processing result of the compiled communication command M, it confirms the last communication command in the compiled communication command M, and, since this communication command is the communication command D, it determines that the compiled communication command M abnormally ended at the communication command C, and, for example, executes the transmission/reception processing of the compiled communication command once again regarding the communication command C and communication command D.

Like this, with the storage system 10, by the primary storage controller 20 compiling the same type of communication commands A to D into a single compiled communication command M and transmitting this to the secondary storage controller 50, the secondary storage controller 50 dividing the compiled communication command M into individual communication commands A to D, executing the processing to the individual communication commands A to D, transmitting the processing result of the compiled communication command M to the primary storage controller 20, and the primary storage controller 20 executing the processing to the transmitted processing result, it is possible to effectively prevent the deterioration in the data transfer performance caused by communicating the same type of communication command each and every time, and it is possible to improve the data transfer performance as a result thereof.

Further, for example, when the processing result C as the processing result of the communication command C abnormally ends, by abandoning the processing of the unexecuted communication command D and transmitting to the secondary storage controller 50 the "abnormally ended" processing result C as the processing result of the compiled communication command M, it is possible to instantaneously report the occurrence of a failure at the point in time such failure occurs, execute processing corresponding to such failure, and the processing performance of the storage system 10 can be improved as a result thereof.

Incidentally, in the present embodiment, although a case was explained where the four split commands for making all four secondary VOLs 700 in a pair status with the primary VOL 600 to be a split status as the communication commands A to D, the present invention is not limited thereto, and, for example, four pair status confirmation commands for confirming the pair status of the four secondary VOLs 700 in a pair status with the primary VOL 600, four update copy communication commands at the time of update copying from the primary VOL 600 to the secondary VOL 700 in predetermined intervals, or four update copy communication commands in which the copy processing was not completed at the time of update copying from the primary VOL 600 to the secondary VOL 700 in predetermined intervals may also be used, and various other similar communication commands may also be employed.

Further, in the present embodiment, although a case was explained where the communication command A, communication command B, communication command C, and communication command D among the plurality of communication commands are the same type of communication commands, the present invention is not limited thereto, and, for instance, so as long as these are the same type of communication commands, four or less communication commands may be compiled into a single compiled communication command, or four or more communication commands may also be compiled into a single compiled communication command.

In addition to a storage system for managing data among disk array devices, the present invention may also be applied to various other apparatuses used in the management of data transfer.

Figure 23:
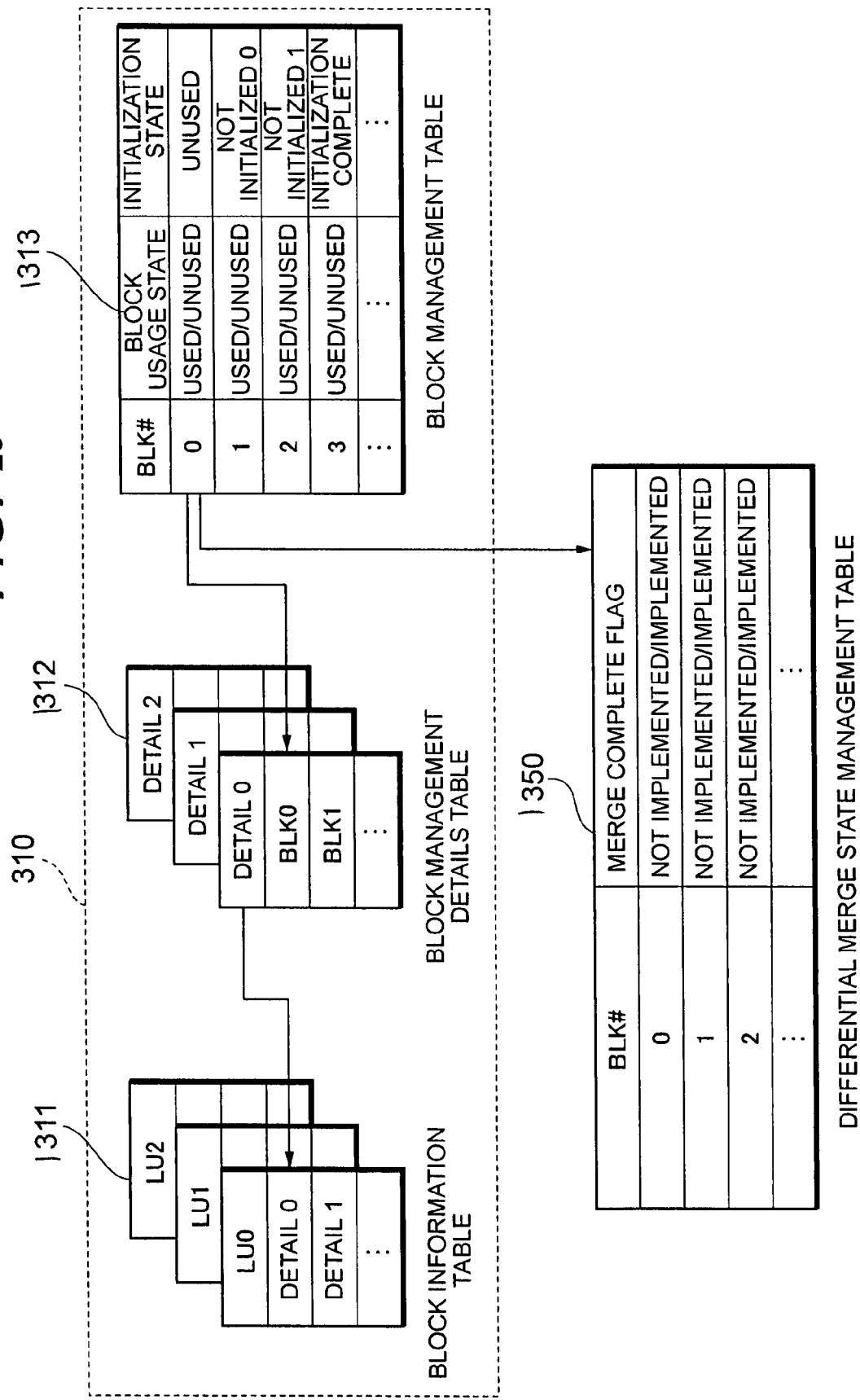
FIG. 23 is a detailed configuration view of a differential bitmap table.

(5) A Primary/Secondary Switching Process for a Storage Control Device at the Time of System Failure FIG. 23 shows a detailed configuration for the differential bitmap table 310.

The differential bitmap table 310 is comprised of a block information table 1311, a block management details table 1312, and a block management table 313.

The block management table 1313 manages "BLK usage state" and "initialization state" for each block region (hereinafter this may also be referred to as "BLK") within the primary VOL 600. "Used" and "unused" exist as BLK usage states. "Used" shows that a block region is being used by a copy system. "Unused" shows that a block region is not being used by a copy system. "Unused", "not initialized 0", "not initialized 1" and "initialization complete" exist as "initialization states". "Unused" shows that a block region is not secured. "Not initialized 0" shows that a block region is not initialized to "0". "Not initialized 1" shows that a block region is not initialized to "1". "Initialization complete" shows that a block region is initialized to "0" or "1".

The block management details table 1312 is the block management table 1313 relating to a plurality of block regions lumped together.

The block information table 1311 is a plurality of block management details tables 1312 lumped together, and manages block regions belonging to each LU (Logical Unit) within a primary VOL 600.

A differential merge state management table 1350 manages the presence or absence of processing for merging from the differential bitmap table 310 to the transfer differential bitmap table 510. A merge complete flag indicates whether a merge process is "implemented" or "not implemented". The details of the merge process are described in the following.

FIG. 24A-D show an outline of merge processing from the differential bitmap table 310 to the transfer differential bitmap table 510. "Black" of the bitmap tables 310 and 510 indicates that a bit is "1", i.e. indicated bit on, and "white" indicates that a bit is "0", i.e. bit off.

Figure 24A:
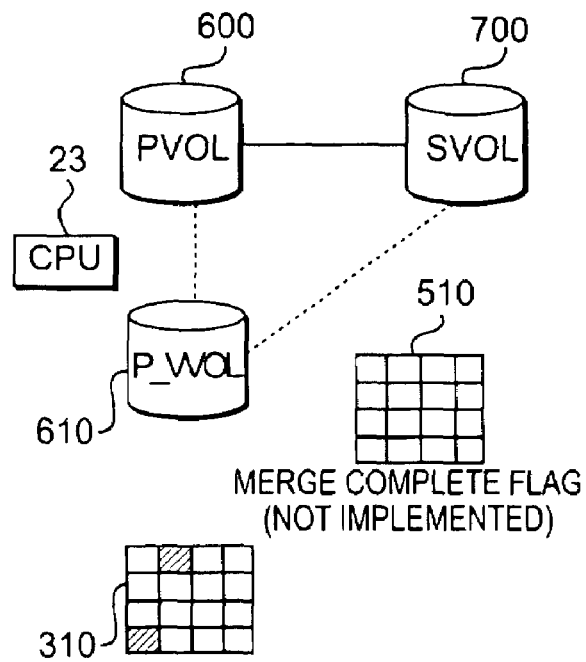
FIG. 24A-D are views illustrating an outline of a merge process.

FIG. 24A shows that the primary VOL 600 and the secondary VOL 700 are in a pair state, and that the merge complete flag is "not implemented".

Figure 24B:
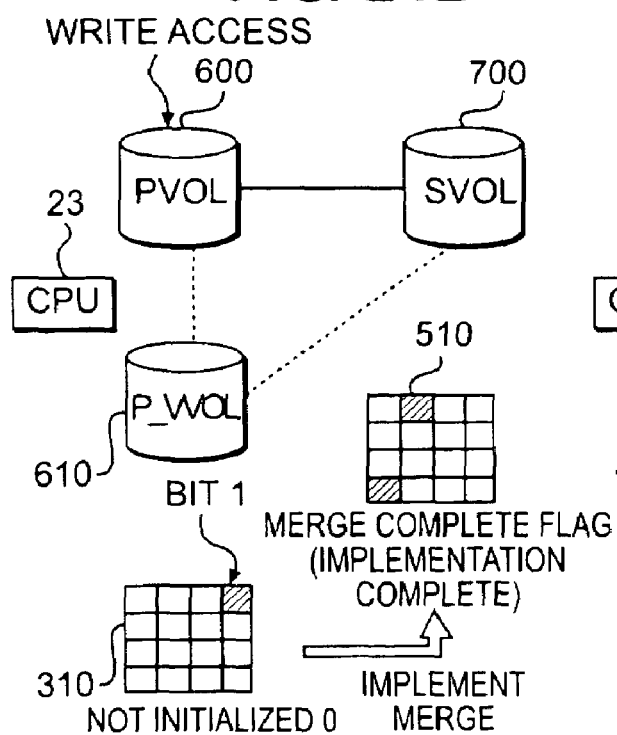

FIG. 24B shows a merge process occurring at the time of a write access to the primary VOL 600. When there is a write access to the primary VOL 600, the CPU 23 refers to the merge complete flag, and checks for the presence or absence of a merge process from the differential bitmap table 310 to the transfer differential bitmap table 510.

The CPU 23 then carries out a bit merge process because the merge complete flag is "not implemented", and the merge complete flag is updated to "implemented". Further, the CPU 23 then updates bits, of the bits of the differential bitmap table 310, that have been subjected to merge processing to "not initialized 0", and bits corresponding to a position where a write access to the primary VOL 600 has occurred are updated to "1".

Figure 24C:
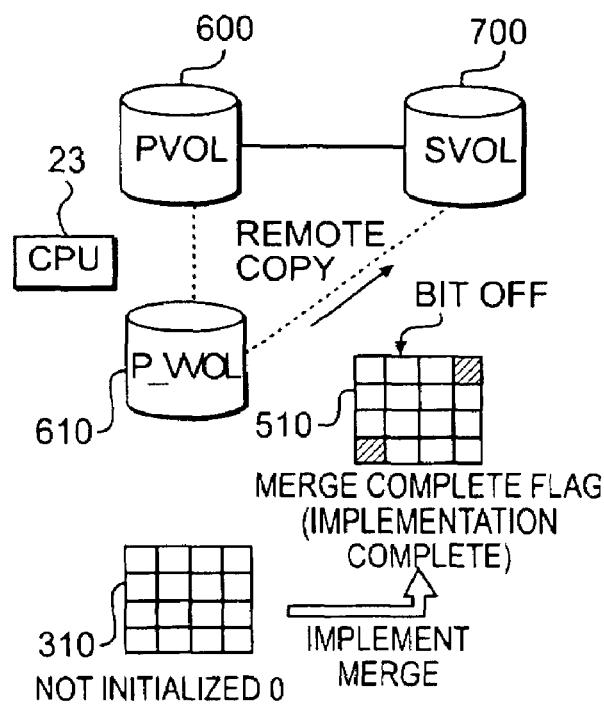

FIG. 24C shows a merge process occurring at the time of remote copying. The CPU 23 carries out merge processing from the differential bitmap table 310 to the transfer differential bitmap table 510 at the time of remote copy implementation and updates the merge complete flag to "implemented". Further, the CPU 23 then updates bits, of the bits of the differential bitmap table 310, that have been subjected to merge processing to "not initialized 0", and updates bits, of the bits of the transfer differential bitmap table 510, corresponding to the position of data remote copied to the secondary VOL 700 to "0".

Figure 24D:
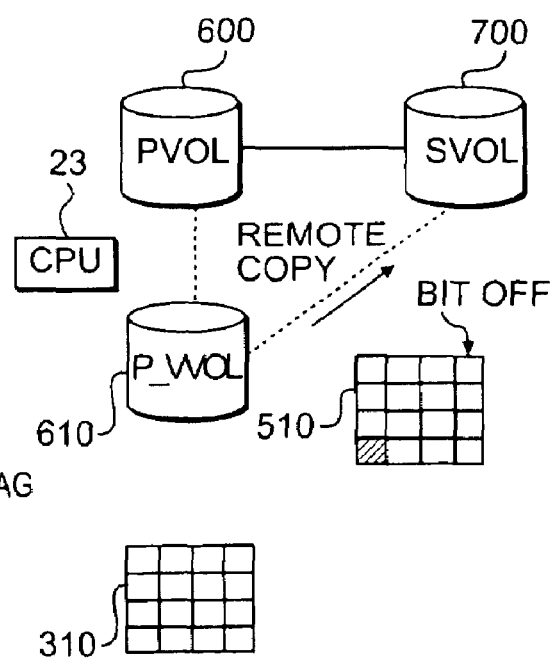

FIG. 24D shows a bit off process of the transfer differential bitmap table 510 occurring at the time of remote copying. Further, the CPU 23 then implements ongoing remote copying while referring to the transfer differential bitmap table 510, and updates bits, of the bits of the transfer differential bitmap table 510, corresponding to the position of data remote copied to the secondary VOL 700 to "0". A bit "1" will therefore not be present in the differential bitmap table 310 until there is a write access to the primary VOL 600.

It is assumed that the pool VOL 620 remote copies data prior to updating from the virtual VOL 610 to the secondary VOL 700 and that as the data prior to updating is temporarily saved, data prior to updating that it is necessary to save in the pool VOL 620 has a bit "1" of the bits of the differential bitmap table 310, that is data prior to updating of block regions corresponding to bits that have not yet been merged in the transfer differential bitmap table 510. Increase in the amount of data stored in the pool VOL 610 can be suppressed by limiting the data prior to updating stored in the pool VOL 610 to data that is required to be remote copied.

On the other hand, data prior to updating saved in the pool VOL 720 is used in data recovery for the secondary VOL 700. It is therefore necessary to save data prior to updating of the secondary VOL 700 in all of the pool VOLs 720.

Figure 25:
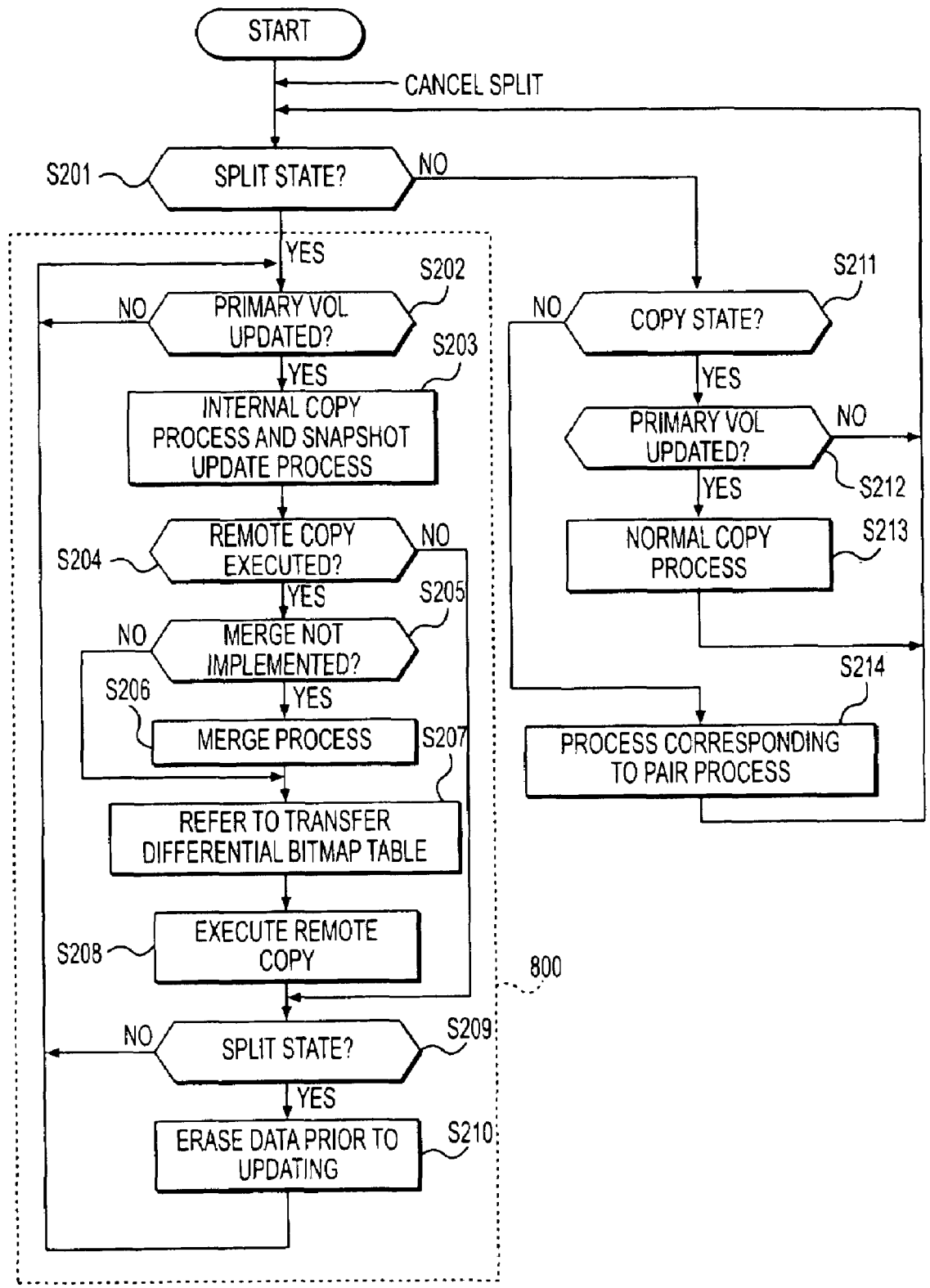
FIG. 25 is a view illustrating an asynchronous remote copy flowchart.

FIG. 25 is a flowchart showing an asynchronous remote copy process sequence executed by the primary storage control device 20.

The CPU 23 puts the pair state between the primary VOL 600 and the virtual VOL 610 to a split state, and updates the volume management table 230 (S1201: YES).

When new data is written to the primary VOL 600 as a result of a write access to the primary VOL 600 (S1202: YES), the CPU 23 executes the internal copy process and snapshot update process described above (S1203).

When there is a write access to the primary VOL 600, the internal copy process and snapshot update process accompanying this write access are repeated at least until a remote copy is implemented during the duration of the split state (S1204: NO).

When a remote copy process is executed during the duration of the split state (S1204: YES), the CPU 23 refers to the margin complete flag, and checks whether or not a process of merging from the differential bitmap table 310 to the transfer differential bitmap table 510 is not yet implemented (S1205).

In the event that the merge process is not yet implemented (S1205: YES), the CPU 23 carries out merge processing from the differential bitmap table 310 to the transfer differential bitmap table 510 (S1206), refers to the transfer differential bitmap table 510 (S1207), and implements remote copying (S1208).

In the event that implementation of the merge processing is complete (S1205: NO), the CPU 23 refers to the transfer differential bitmap table 510 (S207), and implements remote copying (S1208).

When the remote copy is complete and a transition is again made to a split state (S1209: YES), the CPU 23 deletes all of the data prior to updating stored in the pool VOL 620, and also deletes updated information of the snapshot management information 300 (S1210). As a result, the virtual VOL 610 and the snapshot management information 300 are updated in information for reconfiguring a data image for the primary VOL 600 occurring at the point in time of the split state re-starting.

Thereafter, the process of S1202 to S1210 is then repeated. Namely, the loop shown by the dotted frame 800 is formed. At this loop, in the event that, for example, a split state is cancelled, the CPU 23 executes S1201 in a manner isolated from the loop. The process of FIG. 5 described above is an example of a process for the loop shown in the dotted frame 800.

On the other hand, if the split state has not started (S1201: NO), if the pair state between the primary VOL 600 and the virtual VOL 610 is a copy state (S1211: YES), when new data is written to the primary VOL 600 as a result of a write access to the primary VOL 600 (S1212: YES), the normal copy process described above is executed (S1213).

When the pair state of the primary VOL 600 and the virtual VOL 610 is not a split state (S1201: NO), in the event that the state is not a copy state (S1211: NO), processing according to the pair state at this time is carried out (S1214).

In the above description, for ease of description, an example is shown where one PVOL 600 correlates to one pool VOL 620 but this is by no means limiting. A configuration where the primary storage control device 20 is equipped with a plurality of PVOLs and a plurality of pool groups, and data prior to updating from a particular PVOL is only stored in a certain pool group is also possible. Similarly, a configuration where the secondary storage control device 50 is equipped with a plurality of SVOLs and a plurality of pool groups, and data prior to updating from a particular SVOL is only stored in a certain pool group is also possible. A pool group is a storage region comprised of one or more LU's (Logical Units). A pool group may also be referred to as a pool region.

Figures 26, 27:
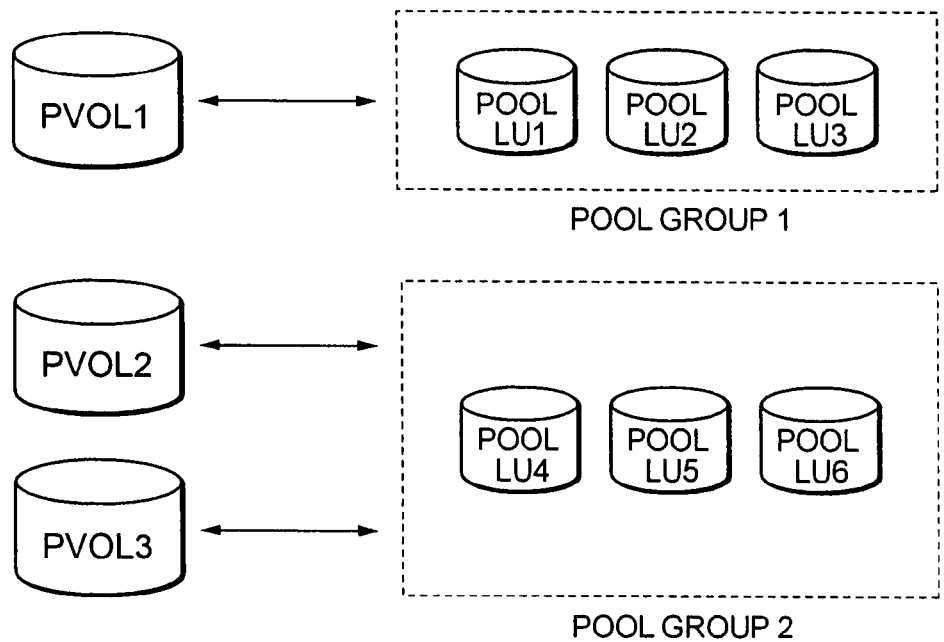
FIG. 26 is a view illustrating a correspondence relationship between PVOLs and pool groups.
FIG. 27 is a view illustrating a pool group—PVOL correspondence table.

FIG. 26 is a view illustrating a correspondence relationship between PVOLs and pool groups. As shown in the same drawing, the primary storage control device 20 is equipped with a plurality of PVOL1, PVOL2, PVOL3, and a plurality of pool groups 1 and 2. PVOL1 correlates to pool group 1, and data saved from PVOL1 is stored in the pool group 1. Pool group 1 is a storage region comprised of LU1, LU2 and LU3. PVOL2 and PVOL3 correlate to pool group 2, and data saved from PVOL2 and PVOL3 is stored in the pool group 2. Pool group 2 is a storage region comprised of LU4, LU5 and LU6.

FIG. 27 shows a pool group—PVOL correspondence table 900. The pool group—PVOL correspondence table 900 stores "pool group #", "assigned LU", and "PVOL#" in a respectively corresponding manner. "Pool group #" shows the number of the pool group. "Assigned LU" shows the number of the LU assigned to a pool group. "PVOL#" shows the number of a PVOL.

In this manner, by storing saved data from a certain PVOL just to a certain pool group, if there is a fault (for example, overflow etc.) at one of the pool groups, this will not influence the other pool groups.

Next, a description is given of the queue management process for the differential data control block 330. The number within the address table 320 shows the number (hereinafter described as the "DDCB number" or the "DDCB#") of the differential data control block 330. When data stored in the pool VOL 620 is erased, it is necessary to make the DDCB queue that managed this erased data an empty queue. The following algorithm can be applied in order to connect to the DDCB and form an empty queue.

(1) A check is made as to whether a DDCB having a DDCB# of D D C B #±1, D D C B #±2, . . . , or D D C B #±N for a "DDCB to be newly connected" exists in an empty queue.

(2) In the event that a plurality of DDCBs having a DDCB# of D D C B #+1, D D C B #+2, . . . , or D D C B #+N for a "DDCB to be newly connected" exist, a connection "DDCB to be newly connected" is made to directly before a DDCB having a DDCB# closest to the DDCB# of the "DDCB to be newly connected".

(3) In the event that only one DDCB having a DDCB# of D D C B #+1, D D C B #+2, . . . , or D D C B #+N for a "DDCB to be newly connected" exists, the "DDCB to be newly connected" is connected immediately before this DDCB.

(4) In the event that a plurality of DDCBs having a DDCB# of D D C B #−1, D D C B #−2, . . . , or D D C B #−N for a "DDCB to be newly connected" exist, a connection "DDCB to be newly connected" is made to directly after a DDCB having a DDCB# closest to the DDCB# of the "DDCB to be newly connected".

(5) In the event that only one DDCB having a DDCB# of D D C B #−1, D D C B #−2, . . . , or D D C B #−N for a DDCB to be newly connected exists, the "DDCB to be newly connected" is connected immediately after this DDCB.

(6) In the event that a DDCB having a DDCB# of D D C B #±1, D D C B#±2, . . . , or D D C B #±N for a "DDCB to be newly connected" does not exist, the "DDCB to be newly connected" is connected to the end of the empty queue.

FIG. 28A-C and FIG. 29A-C show an example of the algorithm described above taking N=1.

Figure 28A:
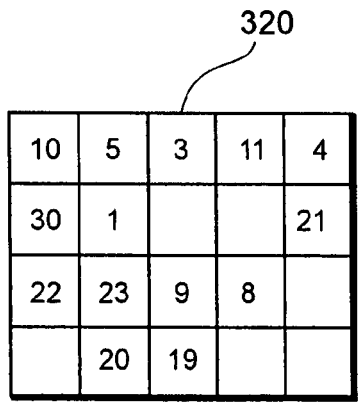
FIG. 28A-C are views illustrating an outline of differential data control block queue management.

FIG. 28A shows an initial state. None of the DDCB queues have made a transition to the empty queue.

Figure 28B:
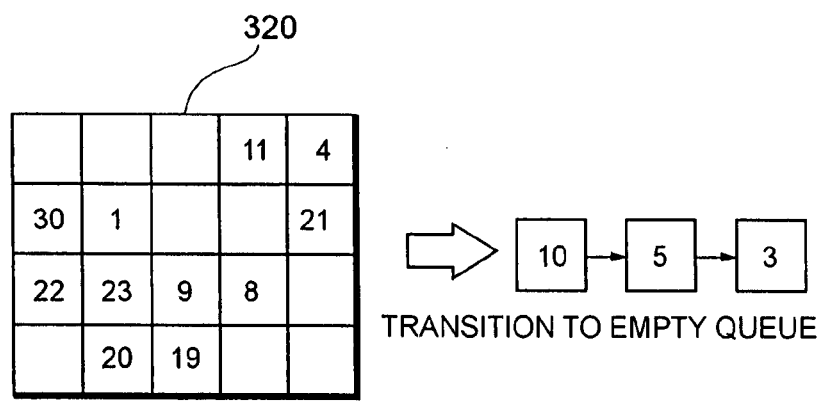

FIG. 28B shows the situation where DDCB queues for DDCB#10, DDCB#5 and DDCB#3 make a transition to the empty queue.

The DCCB of DDCB#4 or DDCB#6 is searched as a process preceding connection of the DCCB of DDCB#5 to the empty queue. As a DDCB for DDCB#10 only exists in the empty queue, the DDCB of DDCB#5 is connected to the tail end of the empty queue.

The DCCB of DDCB#2 or DDCB#4 is searched as a process preceding connection of the DCCB of DDCB#3 to the empty queue. As a DDCB#10 and DDCB#5 only exist in the empty queue, the DDCB of DDCB#3 is connected to the tail end of the empty queue.

Figure 28C:
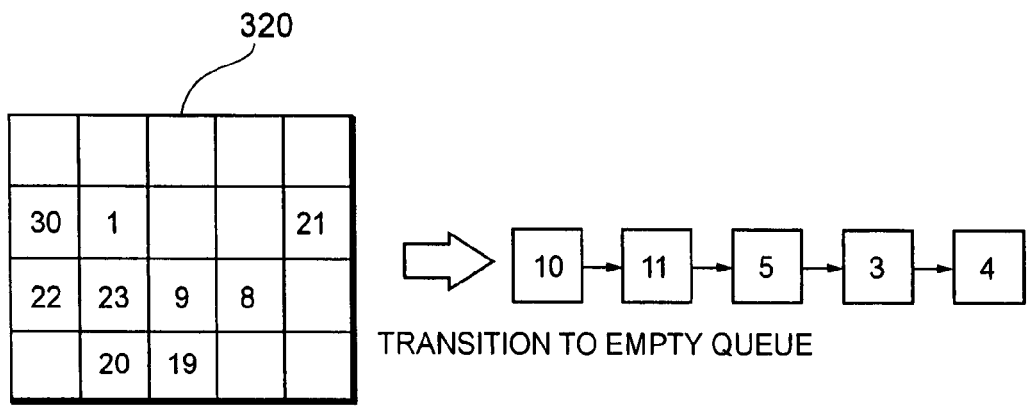

FIG. 28C shows the situation where DDCB queues for DDCB#11 and DDCB#4 make a transition to the empty queue.

The DCCB of DDCB#10 or DDCB#12 is searched as a process preceding connection of the DCCB of DDCB#11 to the empty queue. The DDCB of DDCB#10 is present in the empty queue. The DDCB of the DDCB#11 is therefore inserted directly after the DDCB of DDBB#10 so as to form the empty queue.

The DCCB of DDCB#3 or DDCB#5 is searched as a process preceding connection of the DCCB of DDCB#4 to the empty queue. The DDCB of DDCB#3 is present in the empty queue. The DDCB of the DDCB#4 is therefore inserted directly after the DDCB of DDBB#3 so as to form the empty queue.

Figure 29A:
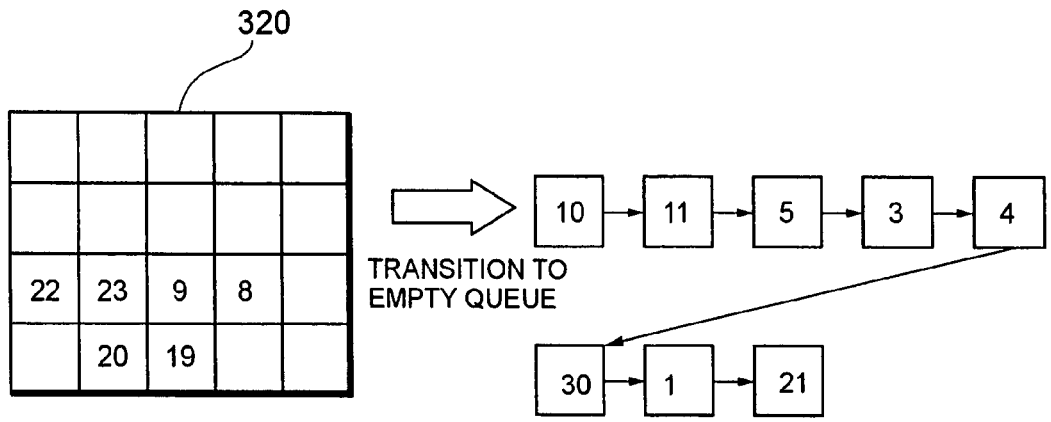
FIG. 29A-C are views illustrating an outline of differential data control block queue management.

FIG. 29A shows the situation where DDCB queues for DDCB#30, DDCB#1 and DDCB#21 make a transition to the empty queue.

The DCCB of DDCB#29 or DDCB#31 is searched as a process preceding connection of the DCCB of DDCB#30 to the empty queue. As DDCB's for DDCB#10, DDCB#5, DDCB#3, DDCB#11 and DDCB#4 only exist in the empty queue, the DDCB of DDCB#30 is connected to the tail end of the empty queue.

The DCCB of DDCB#0 or DDCB#2 is searched as a process preceding connection of the DCCB of DDCB#1 to the empty queue. As DDCB's for DDCB#10, DDCB#5, DDCB#3, DDCB#11, DDCB#4 and DDCB#30 only exist in the empty queue, the DDCB of DDCB#1 is connected to the tail end of the empty queue.

The DCCB of DDCB#20 or DDCB#22 is searched as a process preceding connection of the DCCB of DDCB#21 to the empty queue. As DDCB's for DDCB#10, DDCB#5, DDCB#3, DDCB#11, DDCB#4, DDCB#30 and DDCB#1 only exist in the empty queue, the DDCB of DDCB#21 is connected to the tail end of the empty queue.

Figure 29B:
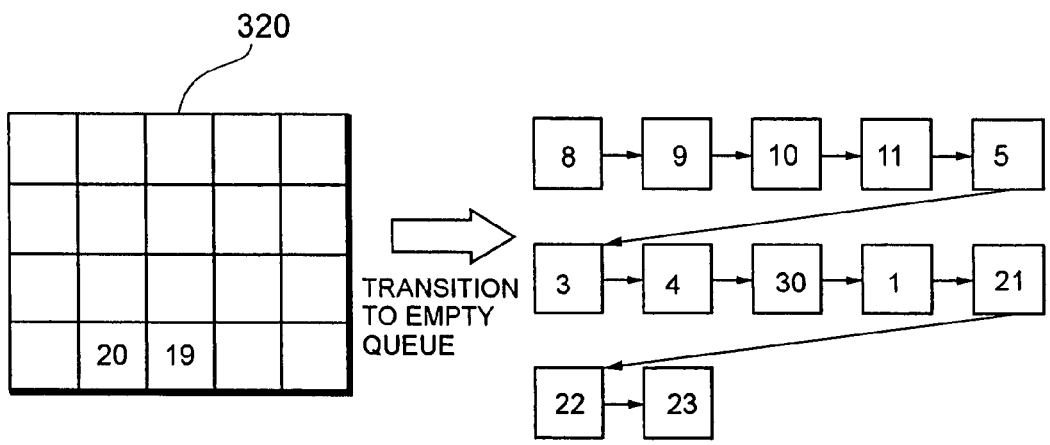

FIG. 29B shows the situation where DDCB queues for DDCB#22, DDCB#23, DDCB#9 and DDCB#8 make a transition to the empty queue.

The DCCB of DDCB#21 or DDCB#23 is searched as a process preceding connection of the DCCB of DDCB#22 to the empty queue. The DDCB of DDCB#21 is present in the empty queue. The DDCB of the DDCB#22 is therefore connected directly after the DDCB of DDBB#21 so as to form the empty queue.

The DCCB of DDCB#22 or DDCB#24 is searched as a process preceding connection of the DCCB of DDCB#23 to the empty queue. The DDCB of DDCB#22 is present in the empty queue. The DDCB of the DDCB#23 is therefore connected directly after the DDCB of DDBB#22 so as to form the empty queue.

The DCCB of DDCB#8 or DDCB#10 is searched as a process preceding connection of the DCCB of DDCB#9 to the empty queue. The DDCB of DDCB#10 is present in the empty queue. The DDCB of the DDCB#9 is therefore connected directly before the DDCB of DDBB#10 so as to form the empty queue.

The DCCB of DDCB#7 or DDCB#9 is searched as a process preceding connection of the DCCB of DDCB#8 to the empty queue. The DDCB of DDCB#9 is present in the empty queue. The DDCB of the DDCB#8 is therefore connected directly before the DDCB of DDBB#9 so as to form the empty queue.

Figure 29C:
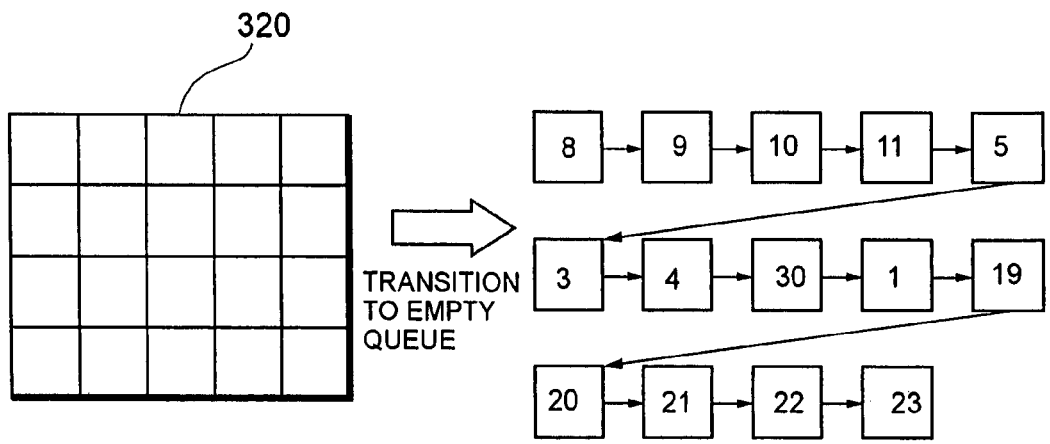

FIG. 29C shows the situation where DDCB queues for DDCB#20 and DDCB#19 make a transition to the empty queue.

The DCCB of DDCB#19 or DDCB#21 is searched as a process preceding connection of the DCCB of DDCB#20 to the empty queue. The DDCB of DDCB#21 is present in the empty queue. The DDCB of the DDCB#20 is therefore connected directly before the DDCB of DDBB#21 so as to form the empty queue.

The DCCB of DDCB#18 or DDCB#20 is searched as a process preceding connection of the DCCB of DDCB#19 to the empty queue. The DDCB of DDCB#20 is present in the empty queue. The DDCB of the DDCB#19 is therefore connected directly before the DDCB of DDBB#20 so as to form the empty queue.

As shown in FIG. 29C, the order of some of the DDCB's of the plurality of DDCB's constituting the empty queue are sequential. When the plurality of DDCB's are sequential, the seek time at the time of disc access to the pool VOL 620 becomes short, and high-speed access can be implemented.

The algorithm described above is not limited to the line-up of the DDCB's for the whole of the empty queue being sequential. It is then preferable to not apply the algorithm described above, but rather apply an algorithm so that the DDCB's become lined up sequentially for the whole of the empty queue.

In the above description, an example is shown for a DDCB queue for managing the pool VOL 620 but this may similarly be applied to DDCB queues for managing the pool VOL 720. In particular, data saved to the pool VOL 620 is data that is the data of the primary VOL 600 at the time of splitting updated, and is not limited to data that is not transferred to the secondary VOL 700, and the pool VOL 720 is used for reconfiguring the secondary VOL 700, and is not limited to data saved to the pool VOL 720. However, the order of the DDCB queue managing the pool VOL 720 is irregular because the order of writing data and the order of deleting data are different. Here, sequential access of the pool VOL 720 can be achieved if the method described above is applied as the queue management method for the DDCB queue for managing the pool VOL 720. In the event that the secondary storage control device 50 is managed as a RAID using RAID level 5 or RAID level 6, it is possible to dramatically reduce priority generation overhead, the effect of which is substantial.

Next, a description is given of the flow of the process for primary/secondary switching while referring to FIG. 30A-E, 31A-E, 32A-F, and 33A-D. The primary/secondary switching process is executed upon a fault occurring in the primary host system 100 or the primary storage control device 20. The primary/secondary switching process is executed as a result of a primary/secondary switching command being sent from the secondary host system 110 to the controller 30. The primary/secondary switching command can be configured using a single command but in this embodiment, an example is shown where the primary/secondary switching command is configured from two commands (an SVOL-takeover command and a Swap-takeover command). The SVOL-takeover command is a command for managing processing of data not yet transferred from the primary VOL 600 to the secondary VOL 700 as a process prior to switching from primary to secondary. The Swap-takeover command is a command for switching an old primary VOL to a new secondary VOL, or an old secondary VOL to a new primary VOL.

In FIG. 30A-E, 31A-E, 32A-F, and 33A-D, "TCA" refers to a pair between the primary VOL 600 and the secondary VOL 700. "TCB" refers to a pair between the virtual VOL 610 and the secondary VOL 700. "QS" refers to a pair between the primary VOL 600 and the virtual VOL 610, or a pair between the secondary VOL 700 and a virtual VOL 710.

First, a description is given with reference to FIG. 30A-E and FIG. 31A-E of the flow of a process for primary/secondary switching in a state where there is no write access to the primary VOL 600.

Figure 30A:
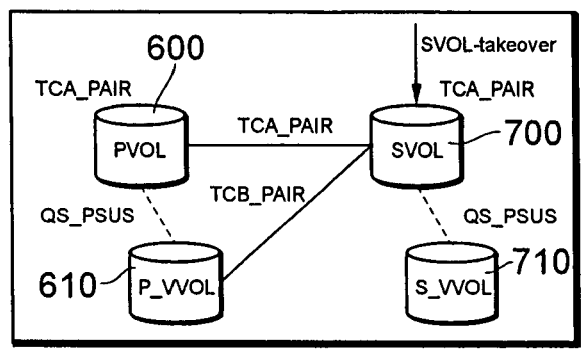
FIG. 30A-E are views illustrating an SVOL-takeover process in the event that there is no write access to a primary volume VOL.

FIG. 30A shows the pair state for each volume at the time when the secondary storage control device 50 receives an SVOL-takeover command from the secondary host system 110. The pair state between the primary VOL 600 and the secondary VOL 700 is "PAIR", the pair state between the virtual VOL 610 and the secondary VOL 700 is "PAIR", the pair state between the primary VOL 600 and the virtual VOL 610 is "PSUS", and the pair state between the secondary VOL 700 and the virtual VOL 710 is "PSUS".

Figure 30B:
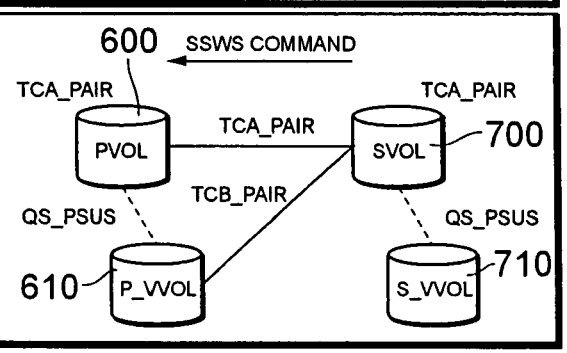

As shown in FIG. 30B, when an SVOL-takeover command is received, the secondary storage control device 50 sends an SSWS command to the primary storage control device 20. The SSWS command is a command that interrogates the primary storage control device 20 as to whether or not there is data that is not yet transferred from the primary VOL 600 to the secondary VOL 700, and in the event that not yet transferred data exists, requests transfer of this not-yet transferred data to the secondary storage control device 50. There is no change in the pair state between each volume.

Figure 30C:
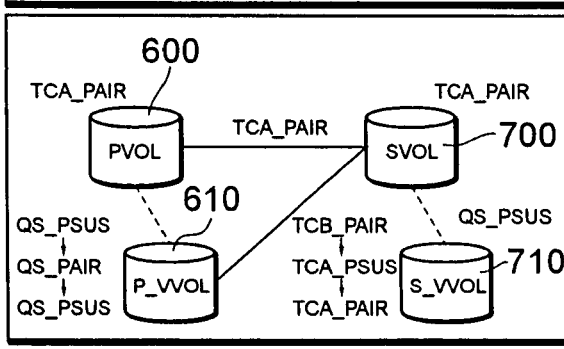

As shown in FIG. 30C, when an SSWS command is received from the secondary storage control device 50, the primary storage control device 20 updates the data within the virtual VOL 610 with data of the primary VOL 600 at this point in time (the time when the pair state of the primary VOL 600 and the virtual VOL 610 is changed to "PSUS") by changing the pair states between the primary VOL 600 and the virtual VOL 610 to "PSUS"→"PAIR"→"PSUS" and changing the pair states between the virtual VOL 610 and the secondary VOL 700 to "PAIR"→"PSUS"→"PAIR", and transfers differential data for before and after updating from the virtual VOL 610 to the secondary VOL 700.

Figure 30D:
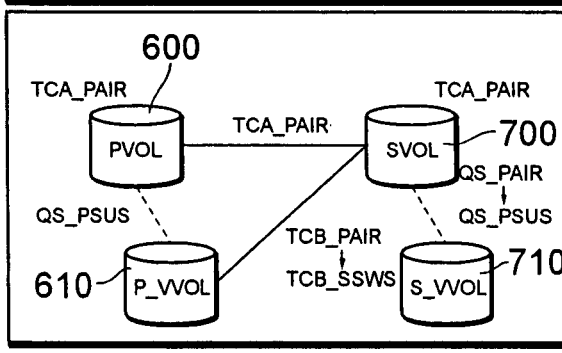

As shown in FIG. 30D, when transfer of differential data from the virtual VOL 610 to the secondary VOL 700 is complete, the storage system 10 changes the pair state between the virtual VOL 610 and the secondary VOL 700 from "PAIR" to "SSWS", and changes the volume state of the virtual VOL 710 to "SMPL". "SMPL" shows a state where there is no primary/secondary relationship for any volume.

Figure 30E:
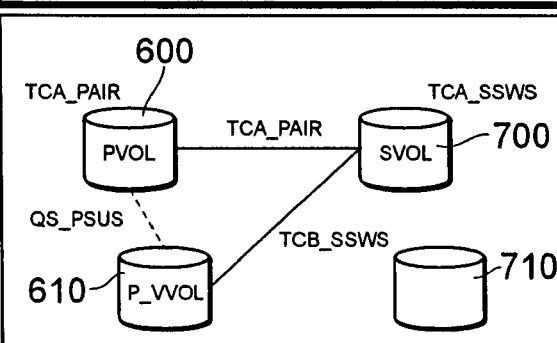

As shown in FIG. 30E, the storage system 10 changes the state of the secondary VOL 700 to "SSWS". "SSWS" shows a state where the secondary VOL 700 is capable of reading/writing. In this state, data of the secondary VOL 700 is reconfigured to content defined for the previous time.

Figure 31A:
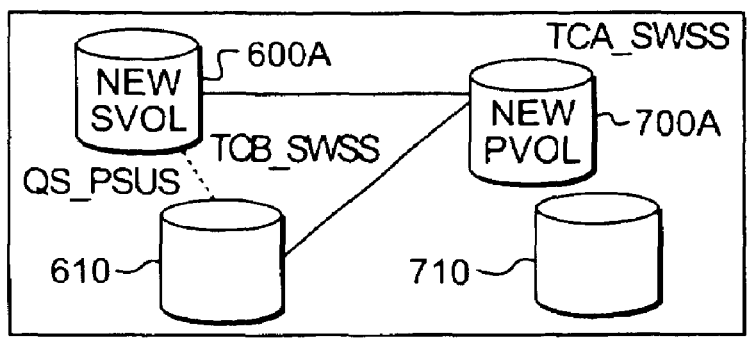
FIG. 31A-E are views illustrating a Swap-Takeover process.

As shown in FIG. 31A, when the secondary storage control device 50 receives a Swap-takeover command from the secondary host system 110, the secondary storage control device 50 executes a process (primary/secondary switching process) to switch the old secondary VOL 700 to a new primary VOL 700A, and to switch the old primary VOL 600 to a new secondary VOL 600A. At this time, in the event that the primary storage control device 20 is reconfiguring data of the new primary VOL 600A using a snapshot within the virtual VOL 610, completion of this reconfigure is awaited, and a transition is made to the state of FIG. 31B.

Figure 31B:
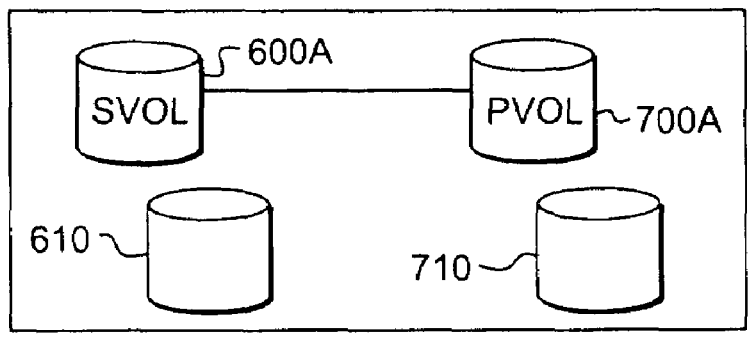

As shown in FIG. 31B, the pair state between the new secondary VOL 600A and the virtual VOL 610 is changed to "SMPL", and the pair state between the new primary VOL 700A and the virtual VOL 610 is changed to "SMPL".

Figure 31C:
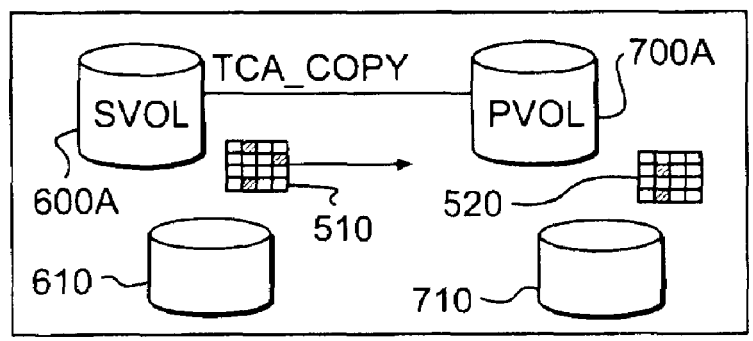

As shown in FIG. 31C, the transfer differential bitmap table 510 is transferred from the primary storage control device 20 to the secondary storage control device 50, and the transfer differential bitmap table 510 is merged with the transfer differential bitmap table 520.

Figure 31D:
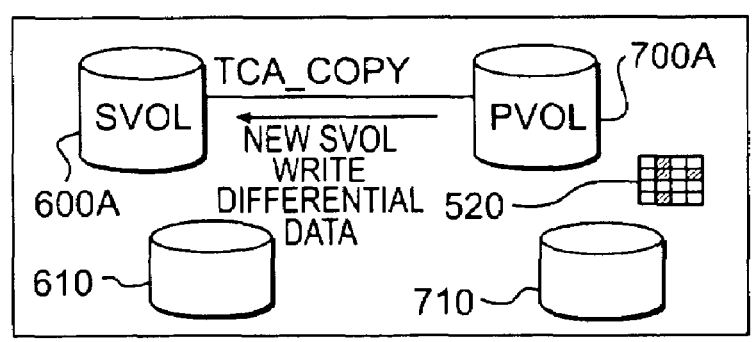

As shown in FIG. 31D, the secondary storage control device 50 executes a process (initial copy) writing differential data to the new secondary VOL 600A based on the transfer differential bitmap table 520.

Figure 31E:
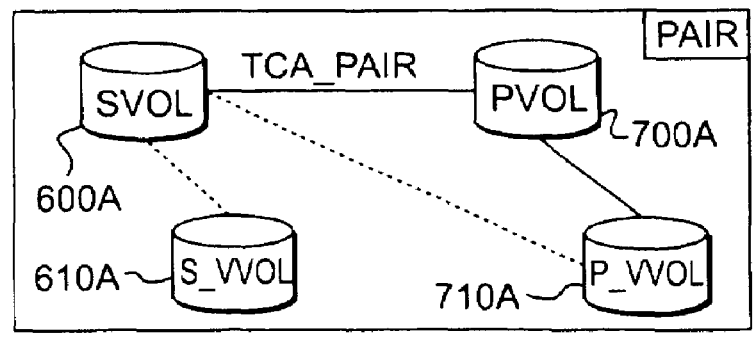

FIG. 31E shows the pair state for each volume after completion of the initial copy. The virtual VOL 610 using the old primary VOL 600 can then be switched to the virtual VOL 610A using the new secondary VOL 600A, and the virtual VOL 710 using the old secondary VOL 700 can be switched to the virtual VOL 710A using the new primary VOL 700A. The pair state between the new primary VOL 700A and the new secondary VOL 600A then becomes "PAIR", and the pair state between the new secondary VOL 600A and the virtual VOL 710A becomes "PAIR". The secondary storage control device 50 is capable of accepting write accesses from the secondary host system 110.

Next, a description is given with reference to FIG. 16A-16F of the flow of a process for primary/secondary switching in a state where there is a write access to the primary VOL 600.

Figure 32A:
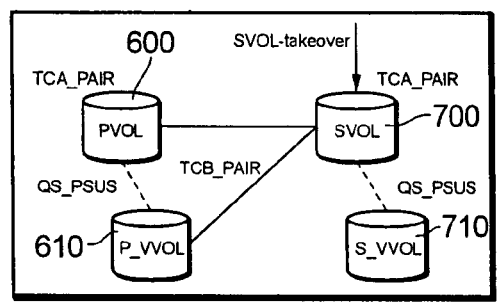
FIG. 32A-F are views illustrating an SVOL-takeover process in the event that there is a write access to a primary volume VOL.

FIG. 32A shows the pair state for each volume at the time when the secondary storage control device 50 receives an SVOL-takeover command from the secondary host system 110. The pair state between the primary VOL 600 and the secondary VOL 700 is "PAIR", the pair state between the virtual VOL 610 and the secondary VOL 700 is "PAIR", the pair state between the primary VOL 600 and the virtual VOL 610 is "PSUS", and the pair state between the secondary VOL 700 and the virtual VOL 710 is "PSUS".

Figure 32B:
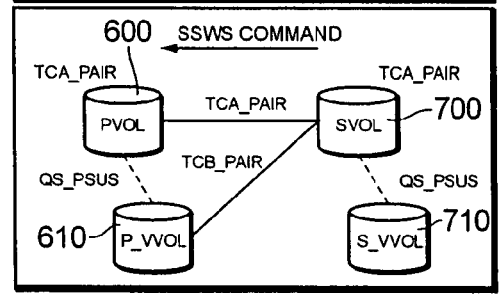

As shown in FIG. 32B, when an SVOL-takeover command is received, the secondary storage control device 50 sends an SSWS command to the primary storage control device 20. There is no change in the pair state between each volume.

Figure 32C:
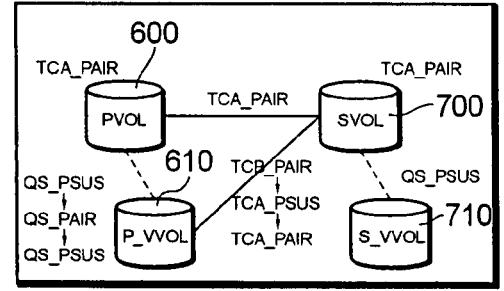

As shown in FIG. 32C, when an SSWS command is received from the secondary storage control device 50, the primary storage control device 20 updates the data within the virtual VOL 610 with data of the primary VOL 600 at this point in time (the time when the pair state of the primary VOL 600 and the virtual VOL 610 is changed to "PSUS") by changing the pair states between the primary VOL 600 and the virtual VOL 610 to "PSUS"→"PAIR"→"PSUS" and changing the pair states between the virtual VOL 610 and the secondary VOL 700 to "PAIR"→"PSUS"→"PAIR", and transfers differential data for before and after updating from the virtual VOL 610 to the secondary VOL 700.

Figure 32D:
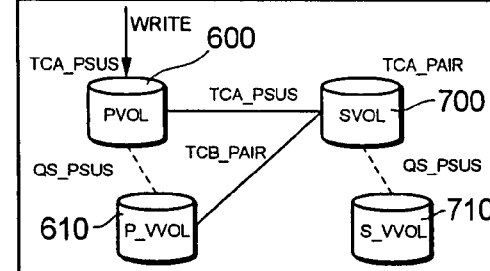

As shown in FIG. 32D, when there is a write access from the primary host system 100, the primary storage control device 20 puts the bit of the differential bitmap table 310 corresponding to the data update position of the PVOL 600 on. The pair state between the primary VOL 600 and the secondary VOL 700 is "PSUS". Regarding data updating of the primary VOL 600 by a write access from the primary host system 100, the primary storage control device 20 only tracks the data update position for the primary VOL 600 using the differential bitmap table 310 and a snapshot is not made.

Figure 32E:
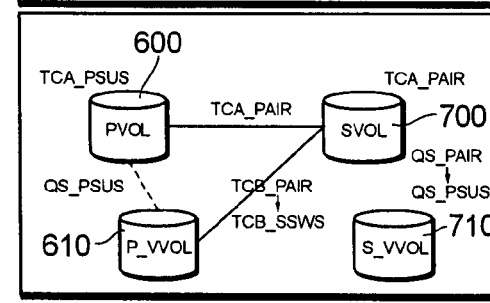

As shown in FIG. 32E, when transfer of differential data from the virtual VOL 610 to the secondary VOL 700 is complete, the storage system 10 changes the pair state between the virtual VOL 610 and the secondary VOL 700 from "PAIR" to "SSWS", and changes the volume state of the virtual VOL 710 to "SMPL".

Figure 32F:
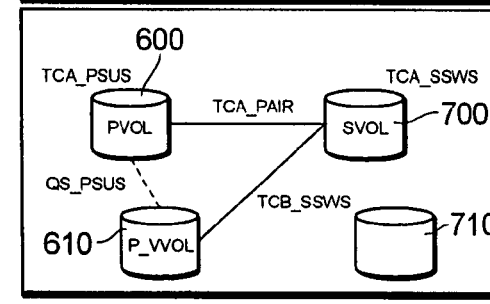

As shown in FIG. 32F, the storage system 10 changes the state of the secondary VOL 700 to "SSWS". "SSWS" shows a state where the secondary VOL 700 is capable of reading/writing. In this state, data of the secondary VOL 700 is reconfigured to content defined for the previous time.

After this, the primary/secondary switching process changes to the process shown in FIG. 31A-E. The details of the process shown in FIG. 31A-E are described above and are therefore not described here.

Next, a description is given of the flow of the process for primary/secondary switching in a situation where the state of the primary storage control device 20 is unclear, while referring to FIG. 33A-D.

Figure 33A:
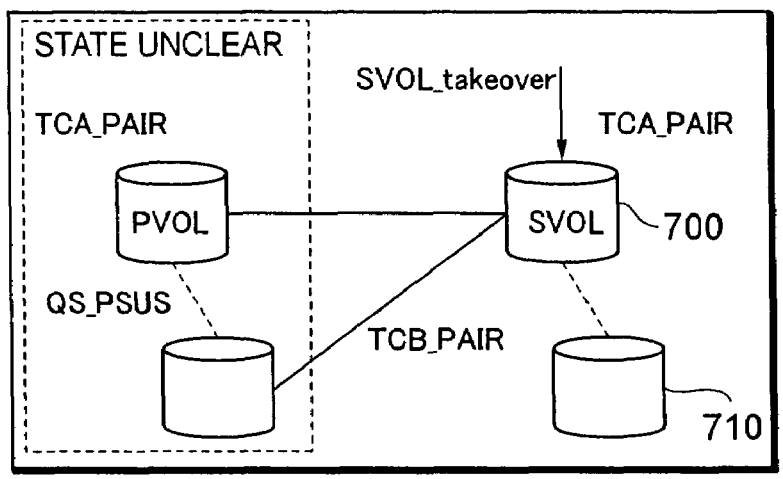
FIG. 33A-D are views illustrating an SVOL-takeover process in the event that a fault occurs in a primary storage control device.

FIG. 33A shows the pair state for each volume at the time when the secondary storage control device 50 receives an SVOL-takeover command from the secondary host system 110.

Figure 33B:
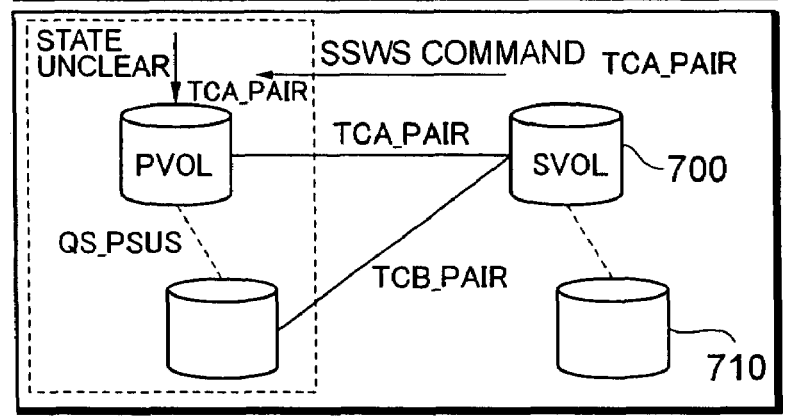

As shown in FIG. 33B, when an SVOL-takeover command is received, the secondary storage control device 50 sends an SSWS command to the primary storage control device 20. However, a fault etc. has occurred at the primary storage control device 20, and a timeout therefore occurs without a response to the SSWS command being sent back.

Figure 33C:
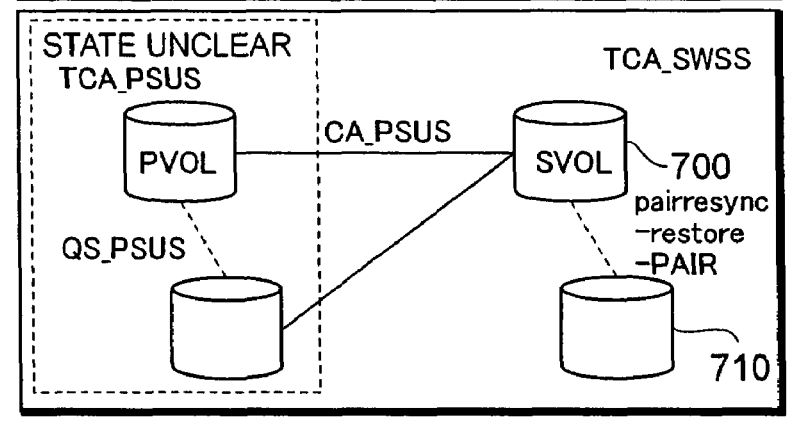

As shown in FIG. 33C, the secondary storage control device 50 then restores the data of the secondary VOL 700 using a snapshot logically held in the virtual VOL 710. The secondary VOL 700 is then capable of reconfiguring to a data image occurring at the time of acquisition of the newest snapshot. The secondary storage control device 50 then changes the state of the secondary VOL 700 to "SSWS".

Figure 33D:
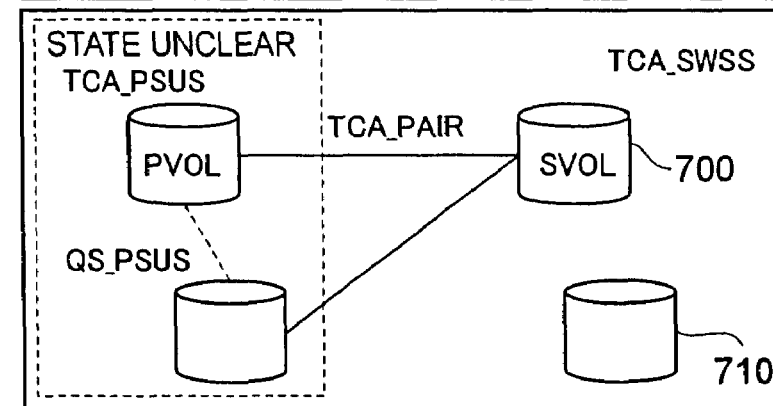

As shown in FIG. 33D, the secondary storage control device 50 changes the state of the virtual VOL 710 to "SMPL".

It is therefore possible for the secondary host system 110 and the secondary storage control device 50 to operate as an operation system by executing the primary/secondary switching process described above in the event of a fault at the primary host system 100 and the primary storage control device 20.

What is claimed is:

1. A storage system comprising a primary storage control device having a first logical volume and a secondary storage control device having a second logical volume capable of forming a copy pair with the first logical volume, said primary storage control device further comprising:

a first differential bitmap table for managing positions of updates to the first logical volume due to host accesses;

first snapshot management information for logically reconfiguring a data image of the first logical volume;

a first pool region for storing differential data prior to updating said data image of the first logical volume as a result of a host access;

a first writing section for writing the data prior to updating to the first pool region when the first logical volume is updated at a predetermined timing onwards;

a first snapshot updating section for updating the first snapshot management information with information for logically reconfiguring said data image for the first logical volume occurring at the time of the predetermined timing when the first logical volume is updated at the predetermined timing onwards;

a first transfer differential bitmap table for managing whether or not update data of the first logical volume has been remote copied to the second logical volume;

a transfer bitmap table update section for updating the first transfer differential bitmap table by merging bit information of the first differential bitmap table with the first transfer differential bitmap table; and a remote copy section for discerning whether each data constituting said data image for the first logical volume at the point in time of the predetermined timing is in the first logical volume or the first pool region based on the updated first transfer differential bitmap table, and acquiring data from the discerned party and transmitting the data to the second logical volume, and said secondary storage control device further comprising:

a second transfer differential bitmap table for managing positions of updates to the second logical volume due to remote copying;

second snapshot management information for logically reconfiguring a data image of the second logical volume;

a second pool region for storing differential data prior to updating said data image of the second logical volume as a result of remote copying data to the second logical volume;

a second writing section for writing the data prior to updating to the first pool region when the second logical volume is updated as a result of remote copying; and a second snapshot updating section for updating the second snapshot management information with information for logically reconfiguring said data image for the second logical volume occurring at the time of the predetermined timing when the second logical volume is updated, wherein said first snapshot management information is selectively managed by either a first block area or a second block area which is smaller than the first block area.

2. The storage system according to claim 1, wherein the secondary storage control device further comprises:

an interrogating section for interrogating the primary storage control device as to whether or not yet to be transferred data that has not been remote copied from the primary storage control device to the secondary storage control device is present when a primary/secondary switching command is received from a host system; and an updating section for, in the event that yet to be transferred data exists, receiving the yet to be transferred data from the primary storage control device and updating the second logical volume.

3. The storage system according to claim 2, wherein the primary storage control device further comprises:

a management section for managing update positions of the first logical volume due to host accesses to the first logical volume occurring at the time of the secondary storage control device receiving the primary/secondary switching command onwards using the first differential bitmap table.

4. The storage system according to claim 2, wherein the secondary storage control device further comprises:

a restoring section for restoring a data image for the second logical volume occurring at a point in time in the past based on the second snapshot management information in the event that there is no response from the primary storage control device to the interrogation.

5. The storage system according to claim 1,
wherein the first writing section, for bits of the first differential bitmap table indicating the presence of a data update, writes the data prior to updating of the first logical volume corresponding to bits not yet merged with the first transfer differential bitmap table to the first pool region.

6. The storage system according to claim 1,
wherein the first logical volume is one of a plurality of logical volumes in the primary storage control device and the first pool region is one of a plurality of pool regions in the primary storage control device,
wherein each of the plurality of logical volumes correlates to at least one of the plurality of pool regions in the primary storage control device, and
wherein the first writing section writes data prior to updating of the first logical volume to the first pool region correlating to the first logical volume.

7. The storage system according to claim 1,
wherein the second logical volume is one of a plurality of logical volumes in the secondary storage control device, and the second pool region is one of a plurality of pool regions in the secondary storage control device,
wherein each of the plurality of logical volumes correlates to at least one of the plurality of pool regions in the secondary storage control device, and
wherein the second writing section writes data prior to updating of the second logical volume to the second pool region correlating to the second logical volume.

8. The storage system according to claim 1,
wherein the first snapshot management information contains a plurality of differential data control blocks correlated to each block of the first pool region,
wherein the primary storage control device further comprises an empty queue management section for connecting differential data control blocks that managed the deleted data prior to updating to an empty queue when the data prior to updating written to the first pool region is deleted, and
wherein the empty queue management section checks whether or not a differential data control block having a number of ±1 of a number of a differential data control block constituting the target of connection is connected to the empty queue while connecting the differential control block that is the target of connection to the empty queue, and connects the differential data control block constituting the target of connection to immediately before the differential data control block having a number of +1 the number of the differential data control block constituting the target of connection in the event that the differential data control block having the number of +1 the number of the differential data control block constituting the target of connection is connected to the empty queue, connects the differential data control block constituting the target of connection to immediately after the differential data control block having a number of −1 the number of the differential data control block constituting the target of connection is connected to the empty queue, and connects the differential data control block constituting the target of connection to the tail end of the empty queue in the event that the differential data control block having a number of ±1 the number of the differential data control block constituting the target of connection is not connected to the empty queue.

9. The storage system according to claim 1,
wherein the second snapshot management information contains a plurality of differential data control blocks correlated to each block of the second pool region,
wherein the secondary storage control device further comprises an empty queue management section for connecting differential data control blocks that managed the deleted data prior to updating to an empty queue when the data prior to updating written to the second pool region is deleted, and
wherein the empty queue management section checks whether or not a differential data control block having a number of ±1 of a number of a differential data control block constituting the target of connection is connected to the empty queue while connecting the differential control block that is the target of connection to the empty queue, and connects the differential data control block constituting the target of connection to immediately before the differential data control block having a number of +1 the number of the differential data control block constituting the target of connection in the event that the differential data control block having the number of +1 the number of the differential data control block constituting the target of connection is connected to the empty queue, connects the differential data control block constituting the target of connection to immediately after the differential data control block having a number of −1 the number of the differential data control block constituting the target of connection in the event that the differential data control block having a number of −1 the number of the differential data control block constituting the target of connection is connected to the empty queue, and connects the differential data control block constituting the target of connection to the tail end of the empty queue in the event that the differential data control block having a number of ±1 the number of the differential data control block constituting the target of connection is not connected to the empty queue.

10. A storage system control method comprising the steps of:
accepting host accesses to a primary storage control device having a first logical volume;
managing positions of updates to the first logical volume due to host accesses using a first differential bitmap table;
writing differential data to a first pool region prior to updating said data image of the first logical volume from the predetermined timing onwards as a result of a host access;
updating first snapshot management information for logically reconfiguring a data image of the first logical volume with information for logically reconfiguring said data image for the first logical volume for the point in time of the predetermined timing when the first logical volume is updated at the predetermined timing onwards;
merging bit information of the first differential bitmap table with a first transfer differential bitmap table for managing whether or not update data for the first logical volume possessed by the primary storage control device is remote copied to a second logical volume possessed by the secondary storage control device;
discerning whether each data constituting said data image for the first logical volume at the point in time of the predetermined timing is in the first logical volume or the first pool region based on the updated first transfer differential bitmap table, and acquiring data from a discerned party and remote copying the data to the second logical volume;

managing positions of updates to the second logical volume due to remote copying using a second transfer differential bitmap table;

writing differential data to a second pool region prior to updating said data image of the second logical volume as a result of remote copying data to the second logical volume;

updating second snapshot management information for logically reconfiguring a data image of the second logical volume with information for logically reconfiguring said data image for the second logical volume for the point in time of the predetermined timing when the second logical volume is updated; and selectively managing said first snapshot management information by either a first block area or a second block area which is smaller than the first block area.

11. The storage system control method according to claim 10, further comprising the steps of:

receiving a primary/secondary switching command from a host system;

interrogating the primary storage control device as to whether or not yet to be transferred data that has not been remote copied from the primary storage control device to the secondary storage control device is present; and in the event that yet to be transferred data exists, receiving the yet to be transferred data from the primary storage control device and updating the second logical volume.

12. The storage system control method according to claim 11, further comprising a step of:

managing update positions of the first logical volume due to host accesses to the first logical volume occurring at the time of receiving the primary/secondary switching command onwards using the first differential bitmap table.

13. The storage system control method according to claim 11, further comprising a step of:

restoring a data image for the second logical volume occurring at a point in time in the past based on the second snapshot management information in the event that there is no response from the primary storage control device to the interrogation.

14. The storage system control method according to claim 10, further comprising a step of:

for bits, of the first differential bitmap table, indicating the presence of a data update, writing the data prior to updating of the first logical volume
corresponding to bits not yet merged with the first transfer differential bitmap table to the first pool region.

15. The storage system control method according to claim 10, wherein the first logical volume is one of a plurality of logical volumes in the primary storage control device and the first pool region is one of a plurality of pool regions in the primary storage control device, wherein each of the plurality of logical volumes correlates to at least one of the plurality of pool regions in the primary storage control device, and wherein the control method further comprises a step of writing data prior to updating of the first logical volume to the first pool region correlating to the first logical volume.

16. The storage system control method according to claim 10,
wherein the second logical volume is one of a plurality of logical volumes in the secondary storage control device, and the second pool region is one of a plurality of pool regions in the secondary storage control device, wherein each of the plurality of logical volumes correlates to at least one of the plurality of pool regions in the secondary storage control device, and wherein the control method further comprises a step of writing data prior to updating of the second logical volume to the second pool region correlating to the second logical volume.

17. The storage system control method according to claim 10, wherein the first snapshot management information contains a plurality of differential data control blocks correlated to each block of the first pool region, wherein the primary storage control device further comprises an empty queue management section for connecting differential data control blocks that managed the deleted data prior to updating to an empty queue when the data prior to updating written to the first pool region is deleted, and wherein the control method further comprises the steps of:

checking whether or not a differential data control block having a number of ±1 of a number of a differential data control block constituting the target of connection is connected to the empty queue while connecting the differential control block constituting the target of connection to the empty queue;

connecting the differential data control block constituting the target of connection to immediately before the differential data control block having a number of +1 the number of the differential data control block constituting the target of connection in the event that the differential data control block having the number of +1 the number of the differential data control block constituting the target of connection is connected to the empty queue;

connecting the differential data control block constituting the target of connection to immediately after the differential data control block having a number of −1 the number of the differential data control block constituting the target of connection in the event that the differential data control block having a number of −1 the number of the differential data control block constituting the target of connection is connected to the empty queue; and connecting the differential data control block constituting the target of connection to the tail end of the empty queue in the event that the differential data control block having a number of ±1 the number of the differential data control block constituting the target of connection is not connected to the empty queue.

18. The storage system control method according to claim 10, wherein the second snapshot management information contains a plurality of differential data control blocks correlated to each block of the second pool region, wherein the secondary storage control device further comprises an empty queue management section for connecting differential data control blocks that managed the deleted data prior to updating to an empty queue when the data prior to updating written to the second pool region is deleted, and wherein the control method further comprises the steps of:

checking whether or not a differential data control block having a number of ±1 of a number of a differential data control block constituting the target of connection is connected to the empty queue while connecting the differential control block constituting the target of connection to the empty queue;

connecting the differential data control block constituting the target of connection to immediately before the differential data control block having a number of +1 the number of the differential data control block constituting the target of connection in the event that the differential data control block having the number of +1 the number of the differential data control block constituting the target of connection is connected to the empty queue;

connecting the differential data control block constituting the target of connection to immediately after the differential data control block having a number of −1 the number of the differential data control block constituting the target of connection in the event that the differential data control block having a number of −1 the number of the differential data control block constituting the target of connection is connected to the empty queue; and connecting the differential data control block constituting the target of connection to the tail end of the empty queue in the event that the differential data control block having a number of ±1 the number of the differential data control block constituting the target of connection is not connected to the empty queue.

* * * * *